(12) United States Patent
Abotabl et al.

(10) Patent No.: US 12,471,109 B2
(45) Date of Patent: Nov. 11, 2025

(54) EARLY TERMINATION OF REPETITIONS

(71) Applicant: QUALCOMM Incorporated, San Diego, CA (US)

(72) Inventors: Ahmed Attia Abotabl, San Diego, CA (US); Ahmed Elshafie, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/177,604

(22) Filed: Mar. 2, 2023

(65) Prior Publication Data

US 2024/0298323 A1   Sep. 5, 2024

(51) Int. Cl.
*H04W 72/23*       (2023.01)
*H04L 1/08*        (2006.01)
*H04W 72/1263*     (2023.01)

(52) U.S. Cl.
CPC ............... *H04W 72/23* (2023.01); *H04L 1/08* (2013.01); *H04W 72/1263* (2013.01)

(58) Field of Classification Search
CPC ...... H04W 72/23; H04W 72/1263; H04L 1/08
See application file for complete search history.

(56) References Cited

U.S. PATENT DOCUMENTS

| | | | |
|---|---|---|---|
| 11,706,760 B2 * | 7/2023 | Wei ................... | H04W 72/1268 370/329 |
| 12,021,626 B2 * | 6/2024 | Ying ....................... | H04L 1/189 |
| 12,256,378 B2 * | 3/2025 | Zhang ................. | H04B 7/0639 |
| 2023/0171784 A1 * | 6/2023 | Fakoorian ................ | H04L 1/08 370/329 |

* cited by examiner

Primary Examiner — Chandrahas B Patel
(74) Attorney, Agent, or Firm — Holland & Hart LLP

(57) ABSTRACT

Methods, systems, and devices for wireless communications are described. A user equipment (UE) may receive a first control signaling including scheduling information including one or more first resources in a time domain for the UE to transmit or receive a set of repetitions of a channel and one or more second resources in the time domain for the UE to transmit or receive a termination indication related to the set of repetitions. The UE may transmit or receive, during at least one resource of the first resources, at least one repetition of the set of repetitions. Following transmitting or receiving the repetition, the UE may transmit or receive, during the second resources, the termination indication prior to a termination of the one or more first resources. The termination indication may be based on successfully transmitting or receiving the at least one repetition of the set of repetitions.

30 Claims, 23 Drawing Sheets

245 Data Repetitions
250
255 Termination Indication
Scheduling Information

201

EARLY TERMINATION OF REPETITIONS

TECHNICAL FIELD

The following relates to wireless communications, including early termination of repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support early termination of uplink or downlink transmission repetitions. For example, the described techniques provide for a user equipment (UE) to receive first control signaling from a network entity including scheduling information. The scheduling information may indicate one or more first resources in a time domain for the UE to transmit or receive a set of uplink or downlink repetitions and one or more second resources in the time domain for the UE to transmit or receive a termination indication related to the set of repetitions. The UE may transmit or receive at least one repetition of the set of repetitions during at least one resource of the one or more first resources. The UE may also transmit or receive the termination indication prior to a termination of the one or more resources and during the one or more second resources. The termination indication may be based on the UE successfully transmitting or receiving a repetition of the set of repetitions.

A method for wireless communication at a UE is described. The method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions, transmitting or receiving, during at least one resource of the one or more first resources, at least one repetition of the set of multiple repetitions, and transmitting or receiving, during the one or more second resources and prior to a termination of the one or more first resources, the termination indication based on successfully transmitting or receiving the at least one repetition of the set of multiple repetitions.

An apparatus for wireless communication at a UE is described. The apparatus may include at least one processor and memory coupled (e.g., operatively, communicatively, functionally, electronically, or electrically) with the at least one processor storing instructions. The instructions may be executable by the at least one processor to cause the apparatus to receive first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions, transmit or receive, during at least one resource of the one or more first resources, at least one repetition of the set of multiple repetitions, and transmit or receive, during the one or more second resources and prior to a termination of the one or more first resources, the termination indication based on successfully transmitting or receiving the at least one repetition of the set of multiple repetitions.

Another apparatus for wireless communication at a UE is described. The apparatus may include means for receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions, means for transmitting or receiving, during at least one resource of the one or more first resources, at least one repetition of the set of multiple repetitions, and means for transmitting or receiving, during the one or more second resources and prior to a termination of the one or more first resources, the termination indication based on successfully transmitting or receiving the at least one repetition of the set of multiple repetitions.

A non-transitory computer-readable medium storing code for wireless communication at a UE is described. The code may include instructions executable by at least one processor (e.g., directly, indirectly, after pre-processing, without pre-processing) to receive first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions, transmit or receive, during at least one resource of the one or more first resources, at least one repetition of the set of multiple repetitions, and transmit or receive, during the one or more second resources and prior to a termination of the one or more first resources, the termination indication based on successfully transmitting or receiving the at least one repetition of the set of multiple repetitions.

Some examples of the method, apparatuses, and non-transitory computer-readable medium described herein may further include operations, features, means, or instructions for transmitting or receiving, during one or more resources non-overlapping in the time domain with the one or more second resources, a feedback message associated with transmitting or receiving the at least one repetition.

In some examples of the method, apparatuses, and non-transitory computer-readable medium described herein, the set of multiple repetitions may be uplink repetitions, and transmitting or receiving the termination indication may include operations, features, means, or instructions for receiving second control signaling including the termination indication in accordance with a transmission format, where the transmission format includes a hybrid automatic repeat request identifier (HARQ-ID) and one or more resource elements.

In some examples of the method, apparatuses, and non-transitory computer-readable medium described herein, the second control signaling may be received in accordance with a same transmission format as the first control signaling.

In some examples of the method, apparatuses, and non-transitory computer-readable medium described herein, the second control signaling may be received in accordance with a different transmission format than the first control signaling.

In some examples of the method, apparatuses, and non-transitory computer-readable medium described herein, the set of multiple repetitions may be downlink repetitions, and transmitting or receiving the termination indication may include operations, features, means, or instructions for transmitting second control signaling including the termination indication.

Some examples of the method, apparatuses, and non-transitory computer-readable medium described herein may further include operations, features, means, or instructions for determining respective log-likelihood ratios (LLRs) for the set of multiple repetitions, where successfully transmitting or receiving the at least one repetition may be based on an estimation associated with a LLR corresponding to the at least one repetition satisfying a threshold value.

Some examples of the method, apparatuses, and non-transitory computer-readable medium described herein may further include operations, features, means, or instructions for transmitting the second control signaling may be based on a power level of the UE satisfying a threshold power level value.

Some examples of the method, apparatuses, and non-transitory computer-readable medium described herein may further include operations, features, means, or instructions for refraining from transmitting or receiving a repetition of the set of multiple repetitions for a duration corresponding to the threshold power level value.

In some examples of the method, apparatuses, and non-transitory computer-readable medium described herein, the termination indication indicates that the UE may be to use a remaining portion of the set of multiple repetitions for energy harvesting, communicating with an energy harvesting device, or both.

In some examples of the method, apparatuses, and non-transitory computer-readable medium described herein, the termination indication indicates that the UE may be to use a remaining portion of the set of multiple repetitions for communications.

In some examples of the method, apparatuses, and non-transitory computer-readable medium described herein, the termination indication includes transmission parameters corresponding to a remaining portion of the set of multiple repetitions, the transmission parameters including a beamforming parameter, a precoder value, a quasi-colocation value (QCL), a transmit power, or any combination thereof.

In some examples of the method, apparatuses, and non-transitory computer-readable medium described herein, receiving the first control signaling may include operations, features, means, or instructions for receiving an indication of a component carrier or a component carrier group associated with transmitting or receiving the termination indication.

Some examples of the method, apparatuses, and non-transitory computer-readable medium described herein may further include operations, features, means, or instructions for transmitting or receiving the at least one repetition using a first component carrier of the component carrier group and transmitting or receiving the termination indication using a second component carrier of the component carrier group.

Some examples of the method, apparatuses, and non-transitory computer-readable medium described herein may further include operations, features, means, or instructions for transmitting or receiving the at least one repetition using the component carrier and transmitting or receiving the termination indication using the component carrier.

A method for wireless communication at a network entity is described. The method may include transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions, transmitting or receiving, during at least one resource of the one or more first resources, at least one repetition of the set of multiple repetitions, and transmitting or receiving, during the one or more second resources and prior to the termination of the one or more first resources, the termination indication based on successfully transmitting or receiving the at least one repetition of the set of multiple repetitions.

An apparatus for wireless communication at a network entity is described. The apparatus may include at least one processor and memory coupled (e.g., operatively, communicatively, functionally, electronically, or electrically) with the at least one processor storing instructions. The instructions may be executable by the at least one processor to cause the apparatus to transmit first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions, transmit or receive, during at least one resource of the one or more first resources, at least one repetition of the set of multiple repetitions, and transmit or receive, during the one or more second resources and prior to the termination of the one or more first resources, the termination indication based on successfully transmitting or receiving the at least one repetition of the set of multiple repetitions.

Another apparatus for wireless communication at a network entity is described. The apparatus may include means for transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions, means for transmitting or receiving, during at least one resource of the one or more first resources, at least one repetition of the set of multiple repetitions, and means for transmitting or receiving, during the one or more second resources and prior to the termination of the one or more first resources, the termination indication based on successfully transmitting or receiving the at least one repetition of the set of multiple repetitions.

A non-transitory computer-readable medium storing code for wireless communication at a network entity is described. The code may include instructions executable by at least one processor (e.g., directly, indirectly, after pre-processing, without pre-processing) to transmit first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions, transmit or receive, during at least one resource of the one or more first resources, at least one repetition of the set of multiple repetitions, and transmit or receive, during the one or more second resources and prior to the termination of the one or more first resources, the termination indication based on successfully transmitting or receiving the at least one repetition of the set of multiple repetitions.

Some examples of the method, apparatuses, and non-transitory computer-readable medium described herein may further include operations, features, means, or instructions for transmitting or receiving, during one or more third resources non-overlapping in the time domain with the one or more second resources, a feedback message associated with transmitting or receiving the at least one repetition.

In some examples of the method, apparatuses, and non-transitory computer-readable medium described herein, the set of multiple repetitions may be uplink repetitions, and transmitting or receiving the termination indication may include operations, features, means, or instructions for transmitting second control signaling including the termination indication in accordance with a transmission format, where the transmission format includes a HARQ-ID and one or more resource elements.

Some examples of the method, apparatuses, and non-transitory computer-readable medium described herein may further include operations, features, means, or instructions for determining respective LLRs for the set of multiple repetitions, where successfully transmitting or receiving the at least one repetition may be based on an estimation associated with a LLR corresponding to the at least one repetition satisfying a threshold value.

In some examples of the method, apparatuses, and non-transitory computer-readable medium described herein, the second control signaling may be transmitted in accordance with a same transmission format as the first control signaling.

In some examples of the method, apparatuses, and non-transitory computer-readable medium described herein, the second control signaling may be transmitted in accordance with a different transmission format than the first control signaling.

In some examples of the method, apparatuses, and non-transitory computer-readable medium described herein, the set of multiple repetitions may be downlink repetitions, and transmitting or receiving the termination indication may include operations, features, means, or instructions for receiving second control signaling including the termination indication.

In some examples of the method, apparatuses, and non-transitory computer-readable medium described herein, the termination indication indicates that the UE may be to use a remaining portion of the set of multiple repetitions for energy harvesting, communicating with an energy harvesting device, or both.

In some examples of the method, apparatuses, and non-transitory computer-readable medium described herein, the termination indication indicates that the UE may be to use a remaining portion of the set of multiple repetitions for communications.

In some examples of the method, apparatuses, and non-transitory computer-readable medium described herein, the termination indication includes transmission parameters corresponding to a remaining portion of the set of multiple repetitions, the transmission parameters including a beamforming parameter, a precoder value, a QCL value, a transmit power, or any combination thereof.

In some examples of the method, apparatuses, and non-transitory computer-readable medium described herein, transmitting the first control signaling may include operations, features, means, or instructions for transmitting an indication of a component carrier or a component carrier group associated with transmitting or receiving the termination indication.

Some examples of the method, apparatuses, and non-transitory computer-readable medium described herein may further include operations, features, means, or instructions for transmitting or receiving the at least one repetition using a first component carrier of the component carrier group and transmitting or receiving the termination indication using a second component carrier of the component carrier group.

Some examples of the method, apparatuses, and non-transitory computer-readable medium described herein may further include operations, features, means, or instructions for transmitting or receiving the at least one repetition using the component carrier and transmitting or receiving the termination indication using the component carrier.

DETAILED DESCRIPTION

In some wireless communications systems, one or more wireless devices may communicate signaling using repetitions to reduce signaling errors and consequently improve transmission reliability and latency. For example, a user equipment (UE) with relatively poor network conditions (e.g., at the edge of a coverage area for a network) may send an uplink transmission or receive a downlink transmission multiple times, with each transmission instance referred to as a repetition, over a set of time-frequency resources. A receiving device (e.g., the UE or a network entity) may monitor for and combine the repetitions to decode the data. A network entity may schedule a set of time-frequency resources for the repetitions, and the UE may transmit or receive the repetitions using the time-frequency resources. However, continuing to transmit or receive repetitions, even if a receiving device has received the previous repetition and decoded the repetition successfully at the receiving device, may cause inefficient power and resource usage at the UE or the network entity.

In some cases, to improve resource allocation efficiency and to reduce energy consumption for downlink repetitions, uplink repetitions, or both, a network entity may configure one or more time-frequency resources for a termination indication. For example, the network entity may transmit control signaling scheduling time-frequency resources for one or more repetitions of a channel and the termination indication. The UE may transmit or receive at least one repetition of the channel prior to transmitting the termination indication. For downlink repetitions, the UE may transmit the termination indication during the scheduled resources before receiving all of the scheduled repetitions. Similarly, for uplink repetitions, the network entity may transmit the termination indication during the scheduled resource before receiving all of the scheduled repetitions. Thus, the UE or the network entity may cancel the remaining repetitions (e.g., for uplink repetitions or downlink repetitions respectively), and the UE may use the remaining repetitions for energy harvesting (e.g., for downlink repetitions) or sidelink communications to reduce power consumption and resource usage at the UE and the network entity.

Aspects of the disclosure are initially described in the context of wireless communications systems. Additional aspects of the disclosure are described with reference to a wireless communications system, a timing diagram, and a process flow. Aspects of the disclosure are further illustrated by and described with reference to apparatus diagrams, system diagrams, and flowcharts that relate to early termination of repetitions.

Figure 1:
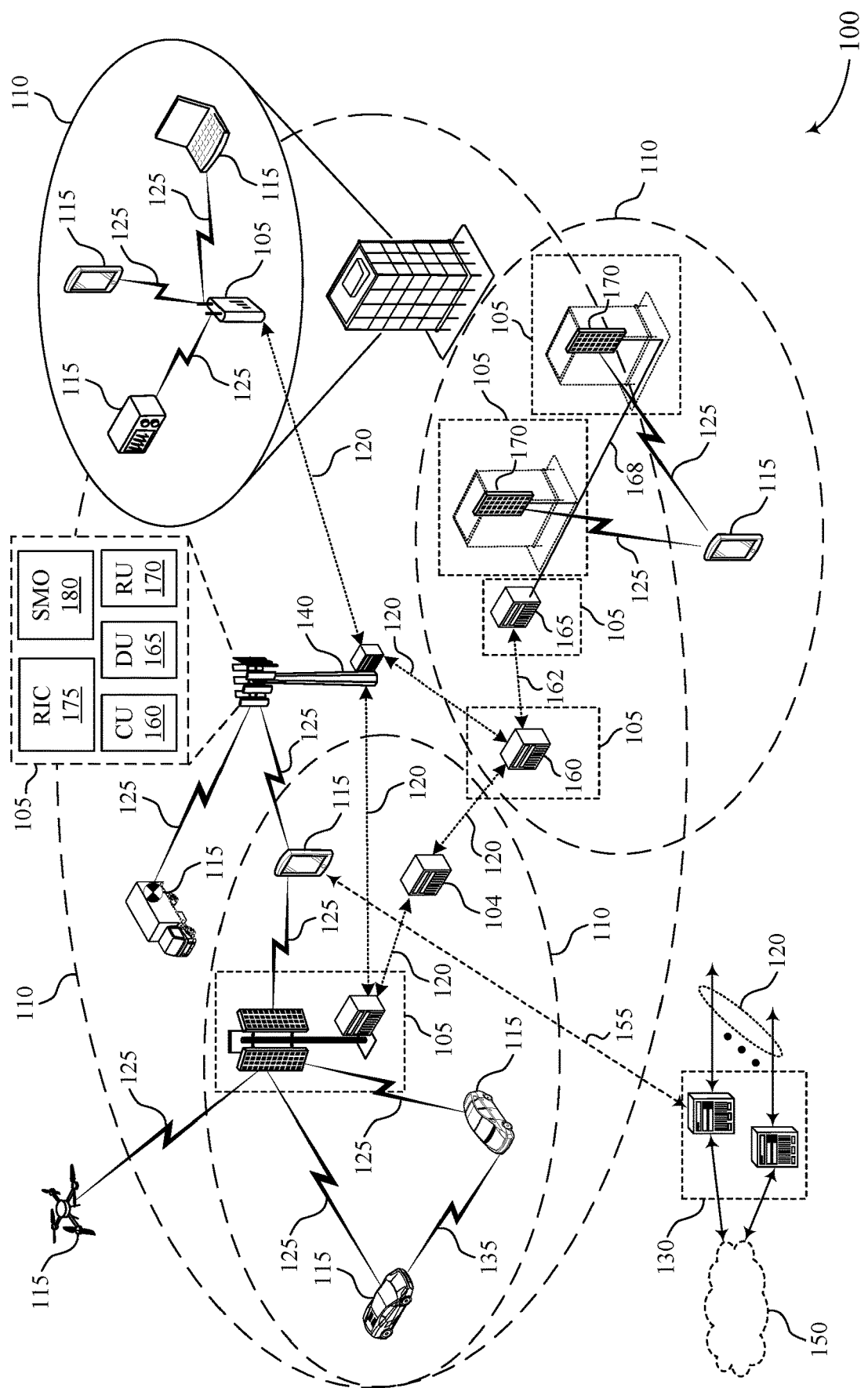
FIG. 1 illustrates an example of a wireless communications system that supports early termination of repetitions in accordance with one or more aspects of the present disclosure.

FIG. 1 illustrates an example of a wireless communications system 100 that supports early termination of repetitions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support early termination of repetitions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may include one or more radio frequency identification (RFID) devices (e.g., zero-power devices), which may be a relatively lightweight IoT device that supports the backscatter communication techniques. A RFID device may additionally, or alternatively, be referred to as a passive device, a passive internet of things (P-IOT) device, a zero-power IoT (ZP-IOT) device, semi-passive device, semi-active device, or active device. In some cases, passive devices may not use a power amplifier, a battery, or both while capturing power from the radio wave for performing transmissions. Semi-passive devices may include a battery (e.g., a rechargeable battery) and/or may be equipped with circuitry configured to harvest energy and store energy from one or more energy sources (e.g., radio frequency signals). Semi-active devices may use active radio frequency components such as a low noise amplifier (LNA), a power amplifier (PA), or both and may use a battery for transmissions. Active devices may use active radio frequency components and generate waveforms or perform transmission techniques and may be classified as IoT devices, where the radio frequency components may use active transmission techniques and may draw power from a battery. In some examples, the semi-active devices and active devices may be equipped with a transmitter, a receiver, a power source, or any combination thereof, which may provide for active transmission techniques. The semi-active devices and active devices may use the active transmission techniques to transmit and receive signals (e.g., transmissions, operations, broadcasts) to and from the one or more wireless devices. In some examples, the devices with passive properties (e.g., passive devices, semi-passive devices) may use the backscatter communication techniques for powering components configured to transmit signals in response to the one or more wireless devices by harvested energy from signals.

In the wireless communications system 100, one or more wireless devices (e.g., one or more UEs 115) may support RFID technology for identification, tracking, and similar use cases. For example, the one or more wireless devices may communicate with one or more RFID devices, via a continuous radio frequency waveform. A RFID device may include an ambient IoT or zero power IoT device (e.g., a tag), which includes an integrated circuit (IC), a rectifier, an energy storage unit, and an antenna, among other components, which may provide for the device to transmit data to a reader (e.g., the one or more wireless devices). In some cases, the rectifier may be an energy harvesting circuit with a diode and a capacitor that meet an energy conversion efficiency threshold (e.g., 30% energy conversion efficiency). A RFID tag may be an RFID tag, an ambient IoT device, a zero power IoT device, a passive IoT device, a semi-passive IoT device, an active IoT device, or any combination thereof.

In some examples, the reader (e.g., the one or more wireless devices) may convert signaling into usable data from the RFID device. The RFID system may use signaling to activate RFID devices, where the RFID devices may not have a battery, or may have limited energy storage (e.g., capacitors). Additionally, or alternatively, the RFID system may use the signaling for communications with the one or more wireless devices. For example, a wireless device may exchange, or transmit, a waveform transmission, which may be a continuous wave (CW) radio frequency waveform transmission, using a forward link and a backscatter link (e.g., a backward link). The wireless device may send the waveform transmission according to a known frequency, and the one or more other wireless devices may receive a transmission from the RFID device in response to the waveform transmission.

The RFID device (e.g., ambient IoT or zero power IoT devices, tag(s)) may be, in some examples, a UE 115 that uses an RFID tag radio at low power states, for one or more sleep modes, for one or more RRC states (e.g., during inactive, idle, connected, or any combination thereof), at one or more defined times based on an implementation at the RFID device or an indication and/or agreement from a base station or network entity 105, or any combination thereof.

The wireless communications system 100 may include devices that use backscatter communication techniques. Backscatter communication techniques may enable one or more devices to communicate without active radio frequency components. For example, backscatter communication may enable a UE 115 such as a RFID device (e.g., a passive tag, a semi-passive tag, an ambient IoT device, or a zero power IoT device, or any combination thereof) that may not include an internal power source (e.g., battery), or has a limited power supply, to communicate with other devices (e.g., which may be referred to as a source device, reading device, a scanning device, or the like). The RFID device may harvest energy from signals (e.g., electromagnetic waves) that may be received over the air to power circuitry used for demodulating signals and for transmitting information in response to a received command.

In some aspects, an RFID device supporting backscatter communication techniques may use an interrogator-talks-first (ITF) procedure between a reader (e.g., the one or more wireless devices) and the RFID device. The ITF procedure may involve a single waveform, which may define the structure and shape of information in transmitted signals. In some examples, the ITF procedure may use a CW, which may be a sinusoidal wave that is modulated with an information-bearing signal to convey information. In some cases, the one or more wireless devices may select a waveform to use to modulate the carrier wave.

In the ITF procedure, the one or more wireless devices, may transmit the waveform transmission (e.g., a continuous radio frequency wave transmission) to the RFID device, which may enable the RFID device to collect energy from the CW transmission. The collected energy at the RFID device may reach some voltage (e.g., IC voltage on), at which point the RFID device may turn on (e.g., power up an IC). In some cases, the waveform transmission may be transmitted for some duration (e.g., greater than or equal to 400 microseconds (µs)) to power up the RFID device. After the duration, the one or more wireless devices may transmit an information signal (e.g., including one or more commands) to the RFID device, where the information signal may also enable the RFID device to harvest energy and remain active (e.g., powered on). The one or more commands may include instructions for the RFID device to transmit some signaling or information requested by the one or more wireless devices. The one or more wireless devices (e.g., a reader) may then transmit the CW transmission to maintain the applied power (e.g., powered up) state of the RFID device until the one or more wireless devices receive a response to the one or more commands. In some aspects, the one or more wireless devices may operate in a fullduplex communications mode to send the CW transmission to maintain the power at the RFID device while receiving signaling from the RFID device in response to a command. In some cases, powering up the RFID device, maintaining the powered-up state of the RFID device, and transmitting the power and carrier wave for the tag modulation may use a same waveform.

In some examples, the one or more wireless devices, the RFID device, or both may modulate the waveform transmission, a modulated waveform transmission, or both according to an amplitude shift keying (ASK) modulation scheme. The ASK modulation may be a form of amplitude modulation representing digital data (e.g., 1s and 0s, steps, binary) as variations of amplitude in the carrier wave. In some examples, ASK modulation may represent the waveform as a series of bits being shifted repeatedly between high and low amplitudes. As such, the RFID systems may implement ASK modulation for forward link ASK and envelope detection, where a wireless device may use envelope detection to find amplitude variations of an incoming signal and to produce a control signal using the variations. As such, the one or more wireless devices may use ASK modulation for the waveforms in backscatter communication to provide stable voltage and power in radio frequency communication. For example, ASK modulation may involve square waveforms with digital on and off states, which show distinct time periods of steady communication. In some cases, the one or more wireless devices, the RFID device, or both may modulate the waveform transmission, the modulated waveform transmission, or both according to an ASK state and a defined modulation efficiency, where a first state may include an IC or antenna resistance match for backscatter power and a second state may include an IC or antenna resistance mismatch where there is no backscatter power.

In some examples, one or more parameters controlling a reflection at the RFID device may indicate for the RFID device to switch reflection off, such that a second wireless device receives a direct link signal from a first wireless device via a communication link. Additionally, or alternatively, the one or more parameters may indicate for the RFID device to switch on reflection, such that the second wireless device receives a superposition of both a direct link signal from the first wireless device and a backscatter link signal from the RFID device.

In some examples of the wireless communications system 100, one or more wireless devices (e.g., a UE 115 or a network entity 105) may communicate signaling using repetitions to reduce signaling errors and consequently improve transmission reliability and latency. For example, a UE 115 with relatively poor network conditions (e.g., at the edge of a coverage area of a network entity 105) may send an uplink transmission or receive a downlink transmission multiple times over a set of time-frequency resources, such that a receiving device (e.g., the UE 115 or the network entity 105) may monitor for and decode the repetitions to obtain the data by comparing signal quality and other aspects of the repetitions to reduce transmission errors. A network entity 105 may schedule a set of time-frequency resources for the repetitions, and the UE 115 may transmit or receive the repetitions using the time-frequency resources. However, continuing to transmit or receive repetitions, even if a receiving device receives the previous repetition and decoded the repetition successfully at the receiving device, may cause inefficient power and resource usage at the UE 115 or the network entity 105. Further, if the UE 115 is a RFID device, the UE 115 may not support the power and resource usage of the repetitions.

In some cases, to improve resource allocation efficiency and to reduce energy consumption for downlink repetitions, uplink repetitions, or both, a network entity 105 may configure one or more time-frequency resources for a termination indication. For example, the network entity 105 may transmit control signaling scheduling time-frequency resources for one or more repetitions of a channel and the termination indication. The UE 115 may transmit or receive at least one repetition of the channel prior to transmitting the termination indication. For downlink repetitions, the UE 115 may transmit the termination indication during the scheduled resources before receiving all of the scheduled repetitions. Similarly, for uplink repetitions, the network entity 105 may transmit the termination indication during the scheduled resource before receiving all of the scheduled repetitions. Thus, the UE 115 or the network entity 105 may cancel the remaining repetitions (e.g., for uplink repetitions or downlink repetitions respectively) or use the remaining resources reserved for the remaining repetitions for energy harvesting purposes or for communicating with other wireless devices (e.g., UEs 115, ambient IoT or zero power IoT devices, other energy harvesting devices) to reduce power consumption and resource usage at the UE 115 and the network entity 105.

Figure 2A:
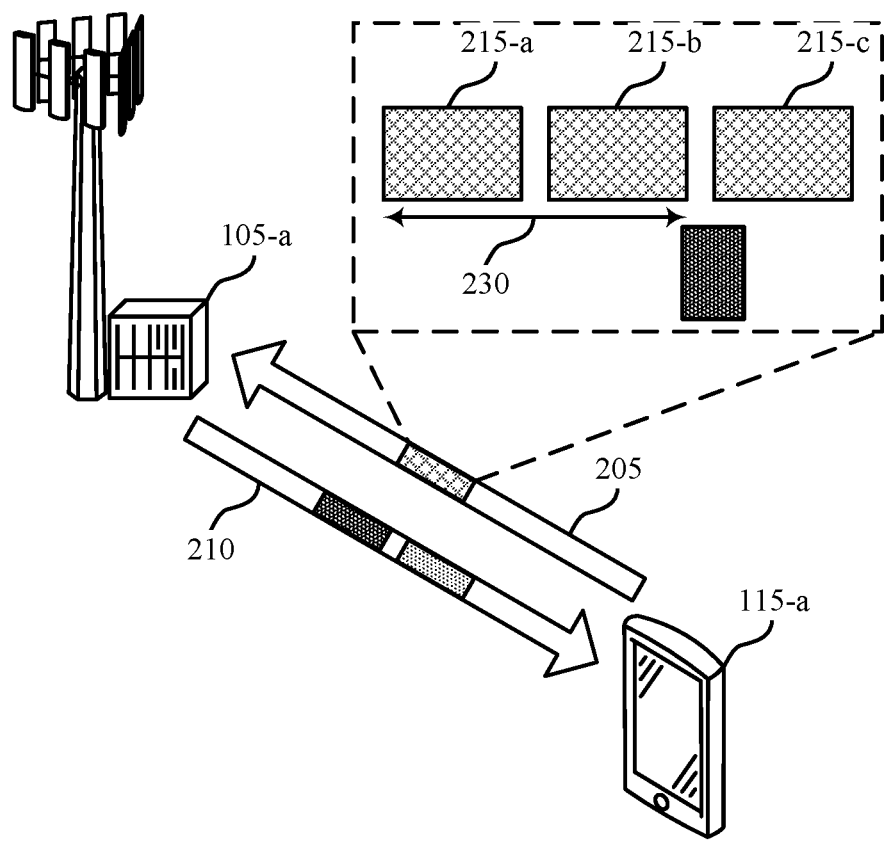
FIG. 2A and FIG. 2B illustrate an example of a wireless communication system that supports early termination of repetitions in accordance with one or more aspects of the present disclosure.

FIG. 2A illustrates an example of a wireless communication system 200 that supports early termination of repetitions in accordance with one or more aspects of the present disclosure. In some examples, the wireless communications system 200 may implement or be implemented by the wireless communications system 100. For example, the wireless communications system may include a UE 115-a, a network entity 105-a, an uplink communication link 205 (e.g., an uplink channel), and a downlink communication link 210 (e.g., a downlink channel). In some examples, the uplink communication link 205 and downlink communication link 210 may be an example of a Uu link, a sidelink, a backhaul link, or some other type of communication link. In some other cases, the UE 115-a may be in communication with one or more other UEs 115 via sidelink communications and may communicate over a sidelink connection.

In some examples, the network entity 105-a or the UE 115-a may transmit or receive data repetitions 215 of a data transmission, transport block, or some other type of information. In some cases, for repetitions of a physical uplink control channel (PUCCH) or a physical uplink shared channel (PUSCH) data transmission there may multiple different patterns or transmission types for transmitting the data repetitions 215. In a first transmission type for the data repetitions 215 (e.g., repetition type A), the UE 115-a may indicate the number of data repetitions 215 dynamically. For example, for a number of data repetitions 215, K, greater than one (e.g., K>1), the UE 115-a may apply the same start and length indicator value (SLIV) across K consecutive slots. As such, when using repetition type A, the UE 115-a may transmit the data repetitions 215 at the end of a slot. For example, if the UE 115-a transmits two data repetitions 215 to the network entity 105-a, the UE 115-a may transmit a first data repetition 215-a at the end of a first slot and a second data repetitions 215-b at the end of a second slot. In some cases, the first data repetition 215-a may be a data transmission (e.g., in a transport block) and the second data repetition 215-b may be a repetition of the data transmission. The data repetition 215-a and the data repetition 215-b may be copies of the same data transmission, and may both be referred to as data repetitions 215.

In a second transmission type for the data repetitions 215 (e.g., repetition type B), the UE 115-a may dynamically indicate the number of data repetitions 215 that may be within or across slots, may cross slot boundaries, support inter-nominal PUSCH frequency hopping, support uplink and downlink symbol interaction, support different SLIVs between data repetitions 215, or any combination thereof. When transmitting K nominal data repetitions 215, each data repetitions 215 may corelate with a nominal length L, and the UE 115-a may transmit the data repetitions 215 back-to-back starting from symbol S, where the SDLIV may indicate the values of S and L. That is, the UE 115-a may transmit the data repetition 215-a at the end of a first slot and rather than transmitting the data repetition 215-b at the end of a second slot, the UE 115-a may transmit the data repetition 215-b at the beginning of the second slot. Thus, the UE 115-a may transmit the data repetition 215-a and the data repetition 215-b back-to-back. In such cases, the network entity 105-a may configure or indicate to the UE 115-a to transmit PUSCH or PUCCH data repetitions 215 to the network entity 105-a using repetition type A, repetition type B, or some other repetition transmission pattern.

In some cases, the UE 115-a may be a low power device. For example, the UE 115-a may have a low battery or low energy capacity. In some examples, the UE 115-a may transmit multiple data repetitions 215 of a data transmission to ensure the network entity 105-a may successfully decode the data transmission. For example, the UE 115-a may be on the edge of the coverage area of the network entity 105-a and may have a relatively poor uplink channel quality and/or a relatively poor downlink channel quality, which may result in a relatively poor connection with the network entity 105-*a* for wireless communications. Due to the relatively poor connection with the network entity 105-*a*, the UE 115-*a* may transmit multiple data repetitions 215 to ensure the network entity 105-*a* may successfully decode a data transmission. Thus, as the UE 115-*a* may transmit a relatively large number of data repetitions 215 to the network entity 105-*a*, the UE 115-*a* may consume a large portion or the entirety of the power capacity of the UE 115-*a* to ensure the network entity 105-*a* successfully decodes the data transmission.

To provide for power savings at the UE 115-*a* and the network entity 105-*a*, the network entity 105-*a* may transmit control signaling including scheduling information 225 indicating a first set of resources for the UE 115-*a* to use to transmit the data repetitions 215 via the uplink communication link 205 and a second set of resources for the network entity 105-*a* to transmit a termination indication 220 via the downlink communication link 210. In some cases, the first set of resources and the second set of resources may include one or more time-frequency resources and may be the same format or different formats.

In some examples, the network entity 105-*a* may transmit the scheduling information 225 via an RRC message, a medium access control channel element (MAC-CE) message, or a downlink control information (DCI) message. In cases, where network entity 105-*a* transmits the scheduling information 225 via a DCI message to enable the first set of resources for the UE 115-*a* to transmit the data repetitions 215, the network entity 105-*a* may transmit the same DCI message as the termination indication 220. When retransmitting the enabling DCI message, the network entity 105-*a* may disable the first set of resources for the UE 115-*a* transmitting the data repetitions 215, therefore indicating to the UE 115-*a* to terminate the transmission of the data repetitions 215. In some cases, the DCI message may use a DCI 2_4 format and may change some of the reserved bits. The network entity 105-*a* may use the DCI 2_4 format to indicate the cancellation of uplink transmissions (e.g., the remaining data repetitions 215). In some other cases, the network entity 105-*a* may use a modified version of the DCI 2_4 format (e.g., scrambled with a different radio network temporary identifier (RNTI)), some other DCI format, or some other control signaling to transmit the termination indication 220 as described herein. In some other cases, a DCI with a DCI format 2_1 may also be used for the termination indication 220. For example, the network entity 105-*a* may use a modified control signal (e.g., by using an RNTI or other identification methods) or a new control signal to indicate transmission occasions, slots, or other time resources for terminating the data repetitions 215. The control signal may be a downlink cancellation DCI, a preemption DCI, or the like according to DCI format 2_1.

If the network entity 105-*a* transmits the termination indication 220 using a DCI message, the network entity 105-*a* may link the termination indication 220 to a DCI used for triggering the data repetitions 215. For example, the network entity 105-*a* may use a DCI message to trigger the UE 115-*a* to transmit the data repetitions 215, and the network entity 105-*a* may transmit a DCI for the termination indication 220 and link the DCI of the termination indication 220 to the DCI used for triggering the transmission of the data repetitions 215. In some cases, the network entity 105-*a* may map the DCIs one-to-one or the network entity 105-*a* may map the termination indication 220 DCI to multiple DCIs used for triggering the UE 115-*a* transmitting the data repetitions 215. In some examples, the DCI used for the termination indication 220 may be the same DCI used to trigger the UE 115-*a* to transmit the data repetitions 215. For example, the DCIs may contain the same HARQ-identifier (HARQ-ID). Additionally, or alternatively, the network entity 105-*a* may use the same resources for the DCI including the termination indication 220 as the resources used for the data repetition 215 triggering DCI, therefore linking both DCIs together. In some cases, when using the same DCI, the network entity 105-*a* may use the first instance of the DCI (e.g., the first reception of a DCI at the UE 115-*a* that triggers a data repetition 215) to enable the UE 115-*a* to transmit the data repetitions 215. The network entity 105-*a* may use the second instance of the DCI (e.g., the second reception of a DCI at the UE 115-*a* including the termination indication 220) to disable the transmission of the data repetitions 215 at the UE 115-*a*.

In some cases, the termination indication 220 may indicate that the network entity 105-*a* may transmit information related to cancelling the remaining data repetitions in a subsequent control indication linked to the termination indication 220. For example, if the termination indication 220 is a DCI message, the termination indication 220 may indicate that the network entity 105-*a* may transmit another DCI message, linked to the termination indication 220 DCI to the UE 115-*a* to instruct the UE 115-*a* to stop transmitting the remaining data repetitions 215. In some examples, the termination indication 220 DCI may include a set of time and frequency resources for the linked DCI. In some other examples, the termination indication 220 may include a configuration for a second stage DCI, or the termination indication 220 may indicate a wait period for the UE 115-*a* to wait to receive the subsequent control indication.

In some examples, the network entity 105-*a* may receive a sufficient quantity of data repetitions 215 to decode the data transmission. The network entity 105-*a* may transmit the termination indication 220, such that the UE 115-*a* may stop the transmission of the data repetitions 215.

In some other examples, the network entity 105-*a* may transmit the termination indication 220 to support power savings at the UE 115-*a*. For example, after receiving the second data repetition 215-*b*, the network entity 105-*a* may transmit the termination indication 220 to indicate to the UE 115-*a* to not transmit (e.g., refrain from transmitting, cancel) a third data repetition 215-*c*.

In some cases, the network entity 105-*a* may determine to transmit the termination indication 220 based on successfully decoding the data transmission, a log-likelihood ratio (LLR) quality, a channel quality of the uplink channel, or any combination thereof. In such examples, the network entity 105-*a* may make such determination after receiving one or more data repetitions 215 or before receiving any data repetitions 215. For example, the network entity 105-*a* may determine the channel quality of the uplink channel based on a sounding reference signal (SRS) transmission or CSI report from the UE 115-*a* prior to the UE 115-*a* transmitting the data repetitions 215. For example, the network entity 105-*a* may be able to decode the data repetitions 215 after a time period 230 or after a number of data repetitions 215 (e.g., after the second data repetition 215-*b*).

Additionally, or alternatively, the SRS transmission or CSI report may indicate the LLR quality of the data repetitions 215. An LLR is the log-domain ratio of the probability a bit of a data repetition 215 (e.g., the data repetition 215-*a*) is a zero and the probability the bit of the data repetition 215-*a* is a one. The LLR quality may be a representation of how accurate the network entity 105-*a* can predict the probability of a bit of the data repetition 215-*a*. The network entity 105-*a* may decode the data repetitions 215 by decoding the individual data repetitions 215 and combing the LLRs of the data repetitions 215. For example, the network entity 105-*a* may decode the data repetition 215-*a*, combine the LLRs with the data repetition 215-*b*, decode the combined data repetition 215, and repeat such process for any remaining data repetitions 215. As such, the network entity 105-*a* may determine how may data repetitions 215 to use to accurately decode the data transmission based on the LLR quality. In some other cases, the network entity 105-*a* may determine how may data repetitions 215 to use to accurately decode the data transmission based on a decoding quality of the network entity 105-*a*.

In some examples, the network entity 105-*a* may transmit the termination indication 220 based on successfully decoding the data repetitions 215. For example, the network entity 105-*a* may decode the data repetition 215-*a*, combine the LLRs with the data repetition 215-*b*, and decode the combined data repetition 215 before the UE 115-*a* transmits the data repetition 215-*c*. In the time before receiving the data repetition 215-*c*, the network entity 105-*a* may successfully decode the data transmission based on decoding the combined data repetition 215. As such, the network entity 105-*a* may transmit the termination indication 220 prior to receiving the data repetition 215-*c*. The termination indication 220 may indicate to the UE 115-*a* to cancel or terminate remaining data repetitions 215 due to successful decoding of the data transmission at the network entity 105-*a*. In some cases, the termination indication 220 may be a feedback message, such as an acknowledgement (ACK) message, indicating the successful decoding of the data transmission.

In some other examples, the network entity 105-*a* may determine a quality of the uplink channel satisfies a threshold value, such that the network entity 105-*a* may use no more than two data repetitions 215 to decode the data transmission (e.g., the first data repetition 215-*a* and the second data repetition 215-*b*). As such, the network entity 105-*a* may determine to wait for a duration prior to decoding the data repetitions 215, for example, until the network entity 105-*a* has received a sufficient quantity of data repetitions 215 for decoding. In some cases, if the channel quality of the uplink channel changes while the UE 115-*a* transmits the data repetitions 215, the network entity 105-*a* may fail to decode the data transmission after terminating the transmission of the data repetitions 215 with the termination indication 220. As such, following decoding or attempting to decode the data repetitions 215, the network entity 105-*a* may transmit a feedback message (e.g., HARQ-ACK message) indicating whether the network entity 105-*a* successfully decoded the data repetitions 215 (e.g., an ACK to indicate a successful decoding and a negative ACK (NACK) for an unsuccessful decoding). In some examples, network entity 105-*a* may transmit the feedback message using a set of resources different and non-overlapping from the first set of resources and the second set of resources.

In some cases, the network entity 105-*a* may transmit the termination indication 220 to have the UE 115-*a* pause the transmission of the data repetitions 245 and perform some additional tasks. The termination indication 220 may indicate latency and priority information to the UE 115-*a*. For example, the latency information may include delay information (e.g., packet delay budget), delay demands related to one or more tasks or services, or a maximum or average amount of time to finish a service or task. The priority information may be an L1 (e.g., physical) or L2 (e.g., MAC) indicator and may indicate the priority of future tasks or services. Additionally, or alternatively, the termination indication 220 may include a quality of service (QoS) indicator for a task of service.

Additionally, or alternatively, when the network entity 105-*a* transmits the termination indication 220 using the second set of resources, the termination indication 220 may indicate that the UE 115-*a* may use the remaining resources from the first set of resources reserved for the UE 115-*a* to transmit the data repetitions 215. If the UE 115-*a* is a power providing device (e.g., an energy providing device) in radio frequency energy harvesting (e.g., a UE 115 with relatively good power supply), the UE 115-*a* may use the remaining resources reserved for the transmission of the data repetitions 215 to assist other devices. For example, the UE 115-*a* may assist in reading one or more ambient IoT or zero power IoT devices (e.g., tags) by sending a radio frequency signal or sending commands (e.g., modulated signals) to the one or more ambient IoT or zero power IoT devices. Additionally, or alternatively, the UE 115-*a* may assist by sending energy or power to an energy harvesting device (e.g., ambient IoT or zero power IoT device or a modem or device with radio frequency energy harvesting capability that may be able to store energy in a supercapacitor or battery). In some cases, the UE 115-*a* may transmit a buffered packet to the network entity 105-*a* related to such low powered devices (e.g., the energy harvesting devices or the one or more ambient IoT or zero power IoT devices). For example, if the UE 115-*a* acts as an RFID reader (e.g., a device that may read signals from one or more ambient IoT or zero power IoT devices), the UE 115-*a* may buffer data read from ambient IoT or zero power IoT device and transmit the buffered data to the network entity 105-*a*.

As such, the network entity 105-*a* may transmit the termination indication 220 to indicate that the UE 115-*a* may use the remaining resources reserved for the data repetitions 215 to assist such devices (e.g., ambient IoT or zero power IoT devices or energy harvesting devices). The UE 115-*a* may use the remaining resources to send energy to one or more energy harvesting devices, ambient IoT devices, or zero power IoT devices, transmit a radio frequency signal to assist in reading an ambient IoT devices, or zero power IoT device, transmit a command to an ambient IoT devices, or zero power IoT device (e.g., to assist with reading information from an ambient IoT devices, or zero power IoT device), transmit a data packet related to the energy harvesting devices, ambient IoT devices, or zero power IoT devices, or any combination thereof. Additionally, or alternatively, the network entity 105-*a* may transmit a beamforming parameter, a precoder value, a quasi-colocation (QCL) value, a transmission power, or any combination of other scheduling or transmission information parameters to the UE 115-*a* to use for the remaining occasions reserved for the UE 115-*a* to transmit the data repetitions 215.

In some cases, the termination indication 220, or subsequent control signaling indicating the cancellation of the remaining repetitions 215 may include transmission parameters for using the remaining repetitions 215. For example, the termination indication 220 may include power information (e.g., power control of how to send energy or information to ambient IoT devices or energy harvesting IoT devices). In some other examples, the termination indication 220 may include beam information such as beam and precoder information to use the remaining resources for other transmission or reception purposes. For example, the beam information may include information for a configuration of at least one analog or digital beam (e.g., for analog or digital beamforming) to send energy, commands, or information to an ambient IoT device or an energy harvesting IoT device. In some cases, the beam information may also include a transmission configuration indicator (TCI) state information or QCL relationships between beams that the UE 115-*a* may use for transmissions (e.g., PUSCH or physical sidelink shared channel (PSSCH)) to assist ambient IoT or energy harvesting devices and transmitting reference signals (e.g., SRS, CSI-RS, synchronization signal blocks (SSBs)).

The UE 115 a may use the resources allocated to the canceled data repetitions 215 to transmit a CW transmission to an energy harvesting device or an ambient IoT device, or a zero power IoT device using the transmission parameters indicated via the termination indication 220. The energy harvesting device or ambient IoT device, or a zero power IoT device may store energy from the CW transmission in a battery or supercapacitor. In some cases, the UE 115-*a* may send a blank or empty transmission (e.g., an empty data packet or a data packet full of null characters), a transmission with random data (e.g., a data packet with random information), or the data repetition 215 (e.g., data repetition 215-*c*) to the energy harvesting device or ambient IoT device, or a zero power IoT device. As such, as the energy harvesting device or ambient IoT device, or a zero power IoT device may refrain from processing the data of the transmission, the UE 115-*a* may transmit a random message as to not waste processing power.

In some other cases, if the UE 115-*a* is an energy harvesting device (e.g., a low power device), the network entity 105-*a* may transmit the termination indication 220 so the UE 115-*a* may save power. In such cases, the UE 115-*a* may refrain from using the remaining resources reserved for transmitting the data repetitions 215, therefore saving the power for transmitting the remaining data repetitions 215 (e.g., the data repetition 215-*c*). The UE 115-*a* may wait until the power or energy of the UE 115-*a* is above a power threshold value and then resume transmitting the remaining data repetitions 215 using the first set of resources. If the UE 115-*a*, or another device, has used the first set of resources, the network entity 105-*a* may transmit an addition scheduling information message indicating a new set of resources for the UE 115-*a* to transmit the data repetitions 215. Otherwise, if there are available resources of the first set of resources, the UE 115-*a* may continue or resume transmitting the data repetitions 215 using the remaining resources.

In some examples, the network entity 105-*a* may indicate via the termination indication 220 that the UE 115-*a* may use the remaining resources for sidelink communications. As such, the network entity 105-*a* may allocate the remaining uplink resources (e.g., resources for the transmission of the data repetition 215-*c*) for the UE 115-*a* to use for communications with another UE 115. Additionally, or alternatively, the termination indication 220 may also include reception parameter for receiving data or energy signals (e.g., if the UE 115-*a* is an energy harvesting device). The reception parameters may include beam information for at least one analog or digital beam (e.g., for beamforming) for the UE 115-*a* to receive a signal related to power.

Similarly, the UE 115 a may use the remaining resources and the reception parameters to assist in reading information from ambient IoT or zero power IoT devices (e.g., tags), sending commands to ambient IoT or zero power IoT devices, sending energy (e.g., power) to energy harvesting devices or ambient IoT or zero power IoT devices, or transmitting a buffered packet to other UEs 115 related to the low powered devices (e.g., the ambient IoT or zero power IoT devices or energy harvesting devices). In some cases, the UE 115-*a* may use the uplink resources to communicate with other UEs 115 in the wireless communications system 200. In some examples, if the UE 115-*a* has decoded the data transmission, the UE 115-*a* may transmit the data transmission to the other UEs 115. In some cases, the UE 115-*a* may transmit data repetitions 215 of the data transmission to another UE 115 to ensure the other UE 115 may be able to decode the data transmission successfully.

Such techniques described herein may also relate to downlink communications. For example, the UE 115-*a* may receive the data repetitions 215 from the network entity 105-*a* and the UE 115-*a* may transmit the termination indication 220. Further description of the techniques of the present disclosure related to downlink communications may be further described with reference to FIG. 3.

Figure 2B:
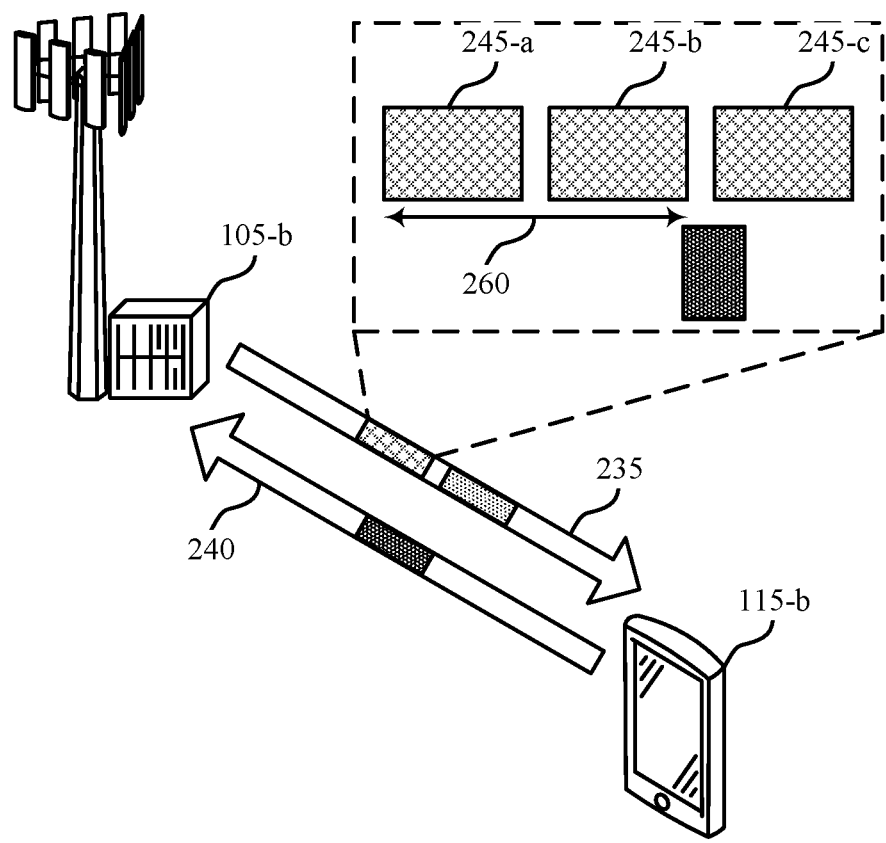
Figure 2B:
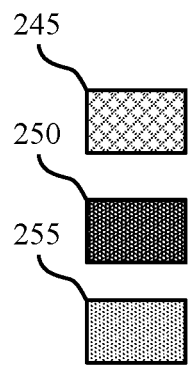

FIG. 2B illustrates an example of a wireless communications system 201 that supports early termination of repetitions in accordance with one or more aspects of the present disclosure. In some examples, the wireless communications system 201 may implement or be implemented by the wireless communications system 100. For example, the wireless communications system 201 may include a UE 115-*b*, a network entity 105-*b*, a downlink communication link 235 (e.g., a downlink channel), and an uplink communication link 240 (e.g., an uplink channel). In some examples, the uplink communication link 240 and downlink communication link 235 may be an example of a Uu link, a sidelink, a backhaul link, or some other type of communication link. In some cases, the UE 115-*b* may be in communication with one or more other UEs 115 via sidelink communications and may communicate over a sidelink connection.

In some examples, the UE 115-*b* may receive data repetitions 245 of a data transmission in accordance to the repetition type A or the repetition type B as described with reference to FIG. 2A. As described herein, the first transmission of the data repetitions 245 (e.g., the data repetition 245-*a*) may be an initial data transmission, and the following data repetitions 245 (e.g., data repetition 245-*b* and data repetition 245-*c*) may be repetitions of the data transmission. The data repetition 245-*a* may be referred to as both a data transmission, a data repetition, as part of the data repetitions 245, or any combination thereof.

In some cases, the network entity 105-*b* may configure the UE 115-*b* to receive multiple physical downlink shared channel (PDSCH) or physical downlink control channel (PDCCH) repetitions (e.g., the data repetitions 245) using L1 or L2 indications. In such a configuration, the UE 115-*a* may transmit a HARQ-ACK message to the network entity 105-*b* after receiving the last data repetition 245 (e.g., the data repetition 245-*c*) with a timing indicator (e.g., PDSCH-to-HARQ feedback timing indicator). However, in some cases, if the UE 115-*b* is a low power device, the UE 115-*b* may run out of power or energy while receiving and decoding the data repetitions 245, or the UE 115-*b* may receive the data repetitions 245 but may not have enough power or energy stored to finish decoding or start decoding the data repetitions 245. As such, the process of the UE 115-*b* receiving and decoding the data repetitions 245 may cause the UE 115-*b* to increase a delay and latency of the wireless communications system 201.

In some cases, the network entity 105-*b* may transmit control signaling including scheduling information 255 to the UE 115-*b*. The scheduling information may indicate a first set of resources for the UE 115-*b* to receive data repetitions 245 via the downlink communication link 235 and a second set of resources for the UE 115-*b* to transmit a termination indication 250 via the uplink communication link 240. The network entity 105-*b* may transmit the scheduling information 255 to provide the UE 115-*b* with resources to transmit the termination indication 250 via uplink control signaling. As such, the UE 115-*b* may transmit the termination indication 250 to prevent unnecessary delay or increase in latency in the wireless communications system 201. For example, if the UE 115-*a* is able to decode the data repetitions after a duration, such as a time period 260 (e.g., after receiving the data repetition 245-*a* and the data repetition 245-*b*), the UE 115-*b* may transmit the termination indication 250 as an ACK message via an uplink control information (UCI) message prior to receiving all of the data repetitions 245. When the network entity 105-*b* receives the UCI indicating the ACK of a successful decoding, the network entity 105-*b* may refrain from transmitting further data repetitions 245 (e.g., the data repetition 245-*c*) to save power at both the UE 115-*b* and the network entity 105-*b*. In such cases, the power consumption of the UE 115-*b* may decrease as the UE 115-*b* may refrain from monitoring the PDSCH or PDCCH if the UE 115-*b* has already successfully decoded the packet or transmission of the data repetitions. Additionally, or alternatively, the power consumption of the network entity 105-*b* may decrease, which may benefit network entities 105 in green communication network designs. Green communication networks may be networks that are sustainable, energy-efficient, energy aware and environmentally aware. As such, reducing the power consumption of the network entity 105-*b* may allow for a more energy efficient network as the network entity 105-*b* may refrain from transmitting unnecessary data or transmissions (e.g., remaining data repetition 245-*c* after the UE 115-*b* has successfully decoded the data transmission).

In some examples, the UE 115-*b* may determine to transmit the termination indication 250 based on a decoding or LLR combining quality of the UE 115-*b*, or based on a channel quality prediction of a downlink channel. For example, the UE 115-*b*, the network entity 105-*b*, or both, may transmit reference signals (e.g., SRS, CSI-RS, SSBs) to determine the path loss of the wireless communications system 201 and therefore the quality of the uplink channel and the downlink channel. As such, based on the quality of the downlink channel, LLR quality of the UE 115-*b*, or a decoding quality of the UE 115-*b*, the UE 115-*b* may predict that the UE 115-*b* may be able to successfully decode the data transmission after the time period 260 (e.g., after receiving the data repetition 245-*a* and the data repetition 245-*b*). Therefore, after the UE 115-*b* receives the data repetition 245-*b*, the UE 115-*b* may transmit the termination indication 250 indicating that the network entity 105-*b* should refrain from transmitting the data repetition 245-*c* and any further data repetitions 245.

In such cases, the termination indication 250 may not be an indication of the UE 115-*b* successfully decoding the data transmission. For example, the UE 115-*b* may predict that the UE 115-*b* can decode the data transmission after receiving two data repetitions 245 (e.g., the data repetition 245-*a* and the data repetition 245-*b*) based on a channel quality estimation calculated before receiving the data repetition 245-*b*. In some cases, in support of the green communication network, the network entity 105-*b* may change (e.g., reduce) the transmission powers between the transmission of the data repetition 245-*a* and the data repetition 245-*b*. Therefore, the network entity 105-*b* may transmit the data repetition 245-*b* with a reduced transmission power compared to the data repetition 245-*a*. Thus, the data repetition 245-*b* may be less reliable than expected by the UE 115-*b*. As such, after the UE 115-*b* transmits the termination indication 250, the UE 115-*b* may attempt and fail to decode the data transmission. Therefore, the UE 115-*b* may transmit a feedback message subsequent to the termination indication 250 indicating whether the UE 115-*b* successfully decoded the data transmission. In cases where the UE 115-*b* transmits a NACK message to the network entity 105-*b* indicating that the UE 115-*b* failed to decode the data transmission, the network entity 105-*b* may attempt to resume transmitting the data repetitions 245 to assist the UE 115-*b* in decoding the data transmission. In some cases, the termination indication 250 may indicate that the UE 115-*b* may not use the remaining resources and the network entity 105-*b*. As such the network entity may use the remaining resources for other transmissions to the UE 115-*b* or the network entity 105-*b* may assign the remaining resources to another UE 115 for communications. However, if the UE 115-*b* fails to decode the data transmission from the received data repetitions 245, the UE 115-*b* may have to wait for a new resource allocation from the network entity 105-*b* to resume the transmission of the data repetitions 245.

In some examples, the UE 115-*b* may transmit the termination indication 250 to indicate that the UE 115-*b* may not have enough power to decode the data transmission or enough power to receive further data repetitions 245 (e.g., the data repetition 245-*c*). In such cases, the network entity 105-*b* may refrain from transmitting further data repetitions 245 for a duration until the UE 115-*b* has enough power or energy to proceed. During this period, the UE 115-*b* may conduct energy harvesting procedures to attempt to recharge or obtain more energy or power. Once the UE 115-*b* receives enough energy or power to proceed, the UE 115-*b* may transmit a UCI message to the network entity 105-*b* to proceed transmitting data repetitions 245. In some cases, the UCI message to indicate to the network entity 105-*b* to proceed with transmissions of the data repetitions 245 may be the same UCI message used as the termination indication 250. The network entity 105-*b* may interpret the first instance of the UCI as a message to disable the transmission of the data repetitions 245 (e.g., the termination indication 250) and the second instance of the UCI as a message to re-enable the transmission of the data repetitions 245. In some cases, the first instance and the second instance of the UCI message may use the same resources or resource elements allocated by the scheduling information 255 via the network entity 105-*b*.

In some examples, when the UE 115-*b* indicates to the network entity 105-*b* to proceed with transmitting the data repetitions 245, the network entity 105-*b* may start transmitting the data repetitions 245 from where the network entity 105-*b* left off and refrain from retransmitting all the data repetitions 245. Such technique of the network entity 105-*b* pausing the transmission of the data repetitions 245 may support increased power savings at the UE 115-*b*, as the UE 115-*b* may use the previously received and decoded data repetitions 245 in conjunction with any new data repetitions 245. In some cases, the UE 115-*a* may transmit the indication to resume transmission of the data repetitions using L1, L2, or L3 indicators. The indication may also include information such as packet or transport block information and transmission information. Such information may include a HARQ-ID, how many data repetitions 245 the UE 115-*b* has received and how many data repetitions 245 the may UE 115-*b* may request, the CSI available at the UE, a suggested modulation and coding scheme (MCS) for the network entity 105-*b*, suggested redundancy version (RV)

indices for the remaining data repetitions 245, a TRP or antenna panel index to receive the remaining data repetitions 245 and/or for the network entity 105-b to transmit, or a combination thereof. The information may also include the power control information described herein (e.g., with respect to FIG. 2A) and information for analog and digital beams (e.g., transmission precoding matrix indicator (TPMI) and SRS resource indicator (SRI)) for beamforming.

In some other examples, the UE 115-b may transmit the termination indication 250 to the network entity 105-b indicating that the UE 115-b may use the remaining resources for energy harvesting purposes. In some cases, the UE 115-b may use the same bands as the network entity 105-b or other network entities, or use different bands that use radio frequency tuning. In such cases, when the UE 115-b may use the remaining resources for other purposes (e.g., energy harvesting or other communications), the UE 115-b may indicate to the network entity 105-b to refrain from transmitting additional information or data transmissions. For example, the UE 115-b may be a half-duplex device and may not be able to receive transmissions while performing energy harvesting procedures or communicating with other devices (e.g., UEs 115, energy harvesting devices, ambient IoT devices, zero power IoT devices, tags, or any combination thereof). When using the remaining resources reserved for the data repetitions 245 for energy harvesting, the network entity 105-b may reconfigure the parameters and contents of the data repetitions 245 to support the energy harvesting procedure. In such cases, the termination indication 250 from the UE 115-b may also include a set of transmission parameters for the network entity 105-b to use to support the energy harvesting procedures. As such, the network entity 105-b use the new set of transmission parameters to transmit random data to the UE 115-b, a data packet with no data at all, or another data repetition 245. The UE 115-b may refrain from processing the remaining data repetitions 245 and instead harvest the energy from the data repetitions 245. As such, since the UE 115-b may refrain from processing any data received, to support energy savings at the network entity 105-b, the network entity 105-b may refrain from sending data to the UE 115-b that causes computations by the network entity 105-b.

In some cases, if the UE 115-b determines that an energy or power level of the UE 115-b during the energy harvesting procedure is above a threshold value, the UE 115-b may indicate to the network entity 105-b to resume transmitting the data repetitions 245 of the data transmission. In some examples, if there are resources remaining in the first set of reserved resources, the network entity 105-b may resume transmitting the data repetitions 245. In some other examples, the energy harvesting procedure may use the remaining resources of the first set of reserved resources. As such, the network entity 105-b may wait until the network entity 105-b obtains a new set of reserved resources for transmitting the data repetitions 245. Once the network entity 105-b obtains the new set of reserved resources, the network entity 105-b may resume transmitting the data repetitions 245 to the UE 115-b.

When the UE 115-b transmits the termination indication 250, instead of indicating that the UE 115-b may use the remaining resources for energy harvesting, in some cases, the termination indication 250 may indicate that the UE 115-b may use the remaining resources for sidelink communications. In such cases, the UE 115-b may use both downlink and uplink slots for the sidelink communications with other UEs 115. For example, since the network entity 105-b transmitted the data repetitions 245 as downlink repetitions, the UE 115-b may use the downlink resources reserved for the transmission of the data repetitions 245 as resources for the sidelink communications. Additionally, or alternatively, the UE 115-b may use the remaining resource to receive information or data related to energy harvesting devices or ambient IoT or zero power IoT devices. For example, the UE 115-b may be an RFID reader (e.g., a reading UE 115) and process information from one or more ambient IoT or zero power IoT devices using the remaining resources. In some cases, the UE 115-b may be an RFID transmitter and be a radio frequency source for power or command transmissions. In some other cases, the UE 115-b may be an RFID transmitter and reader (e.g., the UE 115-b may be a full-duplex device). As such, the UE 115-b may transmit energy to one or more energy harvest devices, ambient IoT devices, or zero power IoT devices.

In some cases, the UE 115-b may indicate via the termination indication that the remaining resources may be used for a combination of energy harvesting (e.g., the UE 115-b harvesting energy, transmitting energy, or both), communications with ambient IoT or zero power IoT devices (e.g., transmitting energy to one or more ambient IoT or zero power IoT devices), sidelink communications, or a combination thereof. For example, the UE 115-b may split the remaining resources into portions and use the different portions for different use cases. In some examples, the network entity 105-b may confirm or deny the use of the remaining resources. For example, the network entity 105-b may transmit a message to the UE 115-b subsequent to receiving the termination indication 250 indicating whether the UE 115-b may use the remaining resources for the indicated use. As such, if the UE 115-b indicates that the UE 115-b may use the remaining resources for sidelink communications, the network entity 105-b may deny the request and may allocate the resources for another use. In some other examples, the network entity 105-b may be configured to, via L1, L2, or L3 indication, with the capability to deny the request from the UE 115-b to use the remaining resources. If the network entity 105-b is not configured with such capability, the network entity 105-b may transmit a feedback message confirming the reallocation of the remaining resources.

In some examples, a network entity 105 or a UE 115 may transmit the data repetitions 245 across multiple component carriers. As such, the UE 115-b or the network entity 105-b may transmit the termination indication 250 on a different component carrier that the initial data transmission (e.g., the data repetition 245-a). Additionally, or alternatively, the network entity 105-b may include a component carrier or a group of component carriers for transmitting the data repetitions 245 and the termination indication 250 in the scheduling information. Such techniques of transmitting and receiving the data repetitions 245 and the termination indication 250 across the component carrier or a component carrier of the group of component carriers may be further described with reference to FIG. 3.

Figure 3:
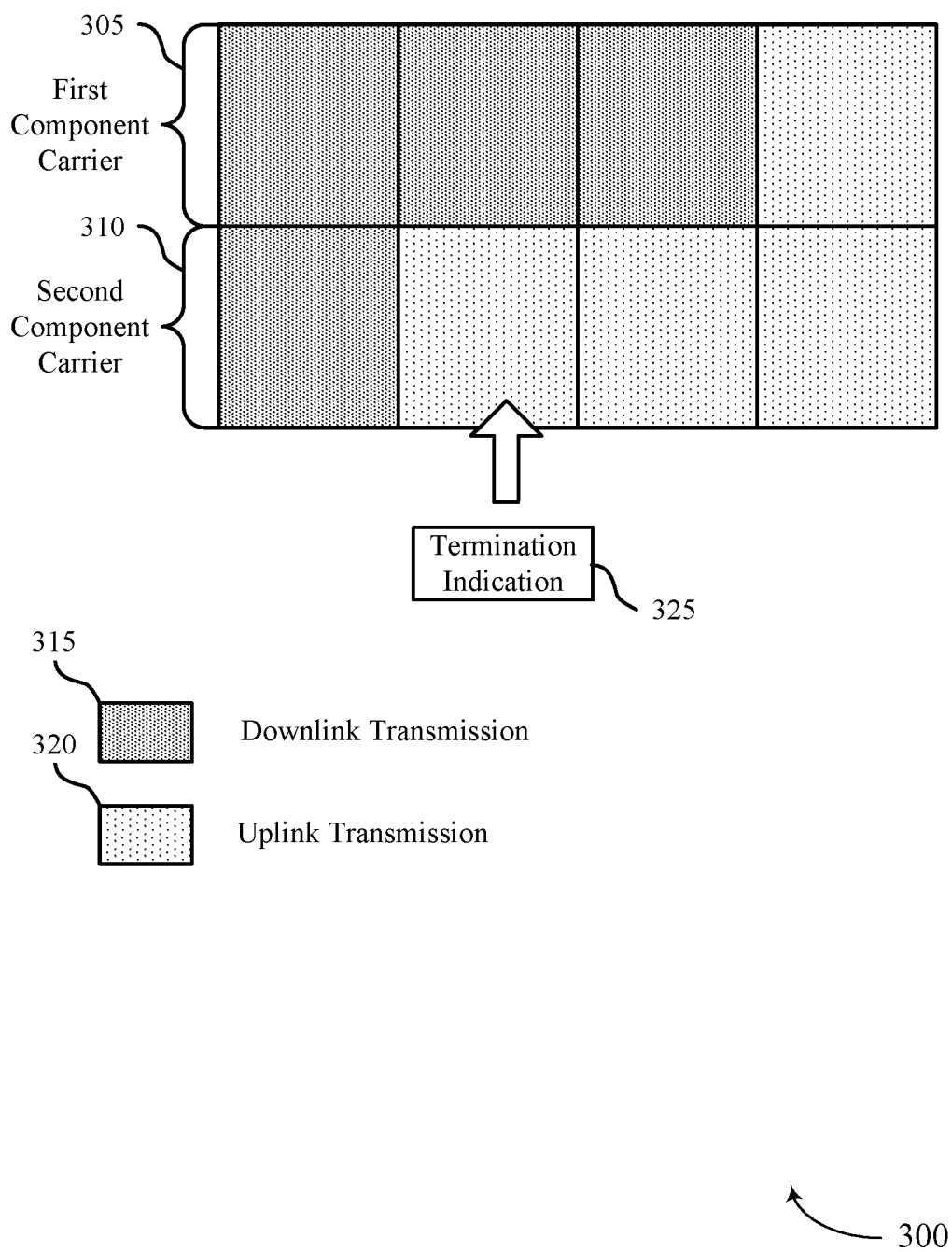
FIG. 3 illustrates an example of a timing diagram that supports early termination of repetitions in accordance with one or more aspects of the present disclosure.

FIG. 3 illustrates an example of a timing diagram 300 that supports early termination of repetitions in accordance with one or more aspects of the present disclosure. In some examples, the timing diagram 300 may implement or be implemented by the wireless communications system 100, the wireless communications system 200, or the wireless communications system 201. For example, the timing diagram may include a first component carrier 305, a second component carrier 310, a downlink transmission 315, an uplink transmission 320, and a termination indication 325.

In some examples, a network entity 105 may transmit a downlink transmission 315 including repetitions of an initial downlink message or an initial downlink transmission 315 (e.g., downlink repetitions 245 with respect to FIG. 2B) to a UE 115. In some cases, the network entity may transmit downlink repetitions on the first component carrier 305 of a component carrier group and receive an uplink transmission 320 from the UE 115. In such cases, after a switch to the second component carrier 310 of the component carrier group, the network entity 105 may continue to transmit the downlink repetitions on the second component carrier 310.

In some cases, after the UE 115 receives the first downlink repetition on the second component carrier 310, the UE 115 may determine to terminate any remaining downlink repetitions. As such, the UE 115 may transmit an uplink termination indication 325 to terminate the downlink repetitions. The termination indication 325 may indicate to terminate the downlink repetitions (e.g., downlink transmissions 315) of the initial downlink transmission transmitted on the first component carrier 305. That is, the UE 115 may transmit the termination indication 325 in the second carrier group which may terminate the downlink repetition that the network entity 105 initiated in the first carrier group.

In some implementations, the network entity 105 may indicate a component carrier or a group of component carriers for which the UE 115 may transmit the termination indication 325 in scheduling information used to enable the termination indication 325. For example, the scheduling information may indicate a group of component carriers, including the second component carrier 310 but not including the first component carrier 305. As such, the UE 115 may transmit the termination indication 325 on the second component carrier 310 but not the first component carrier 305, or the UE 115 may transmit the termination on any other component carrier indicated in the group of component carriers. Additionally, or alternatively, the UE 115 may receive downlink repetitions on the component carrier indicated via the scheduling information (e.g., the first component carrier 305) and the UE 115-a may transmit an uplink termination indication 325 on the same component carrier as the received downlink repetitions.

The UE 115 may receive downlink transmissions 315 from the network entity 105 and transmit uplink transmissions 320 to the network entity. The network entity 105 may transmit the downlink transmissions 315 as repetitions of a same transmission and the UE 115 may transmit an uplink transmission 320 which may include the termination indication 325. The termination indication 325 may indicate to the network entity 105 to refrain from transmitting additional repetitions. In some cases, the UE 115 may transmit repetitions as uplink transmissions 320 and the network entity 105 may transmit a termination indication 325 as a downlink transmission 315.

Figure 4:
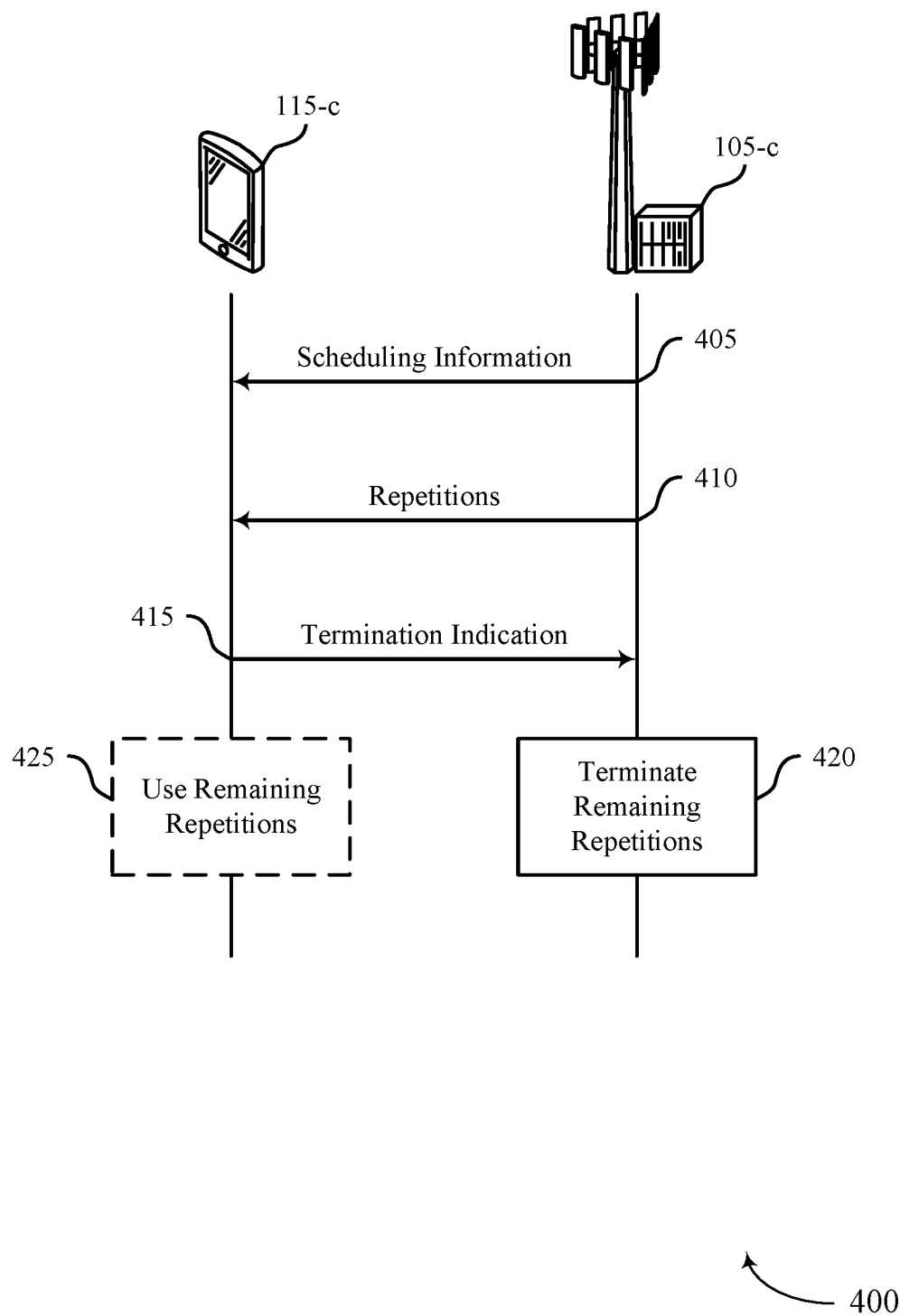
FIG. 4 and FIG. 5 illustrate an example of a process flow that supports early termination of repetitions in accordance with one or more aspects of the present disclosure.

FIG. 4 illustrates an example of a process flow 400 that supports early termination of repetitions in accordance with one or more aspects of the present disclosure. In some examples, the process flow 400 may implement or be implemented by the wireless communications system 100, the wireless communications system 201, or the timing diagram 300. For example, the process flow 400 may include a UE 115-c and a network entity 105-c, which may represent examples of corresponding devices described herein. In this example, the UE 115-c may receive repetitions of a data transmission from the network entity 105-c based on a scheduling transmitted by the network entity 105-c.

In the following description of the process flow 400, the operations between the UE 115-c and the network entity 105-c may be performed in different orders or at different times. Some operations may also be left out of the process flow 400, or other operations may be added. Although the UE 115-c and the network entity 105-c are shown performing the operations of the process flow 400, some aspects of some operations may also be performed by one or more other wireless devices.

At 405, the UE 115-c may receive a first control signaling from the network entity 105-c including scheduling information indicating one or more first resources in a time domain for the UE 115-c to receive a set of repetitions of a channel. The scheduling information may also indicate one or more second resources in the time domain for the UE 115-c to transmit a termination indication related to the set of repetitions. In some cases, the first control signaling may also indicate a component carrier or a component carrier group for the UE 115-c to transmit the termination indication on.

At 410, the UE 115-c may receive at least one repetition of the set of repetitions from the network entity 105-c during at least one resource from the one or more first resources indicated by the scheduling information at 405. In some cases, the UE 115-c may receive the repetition using the component carrier indicated via the scheduling information or a first component carrier of the component carrier group indicated via the scheduling information at 405.

At 415, the UE 115-c may transmit the termination indication to the network entity 105-c during the one or more second resources and prior to a termination of the one or more first resources (e.g., resources reserved for the UE 115-c to receive and the network entity 105-c to transmit the set of repetitions). The UE 115-c may determine to transmit the termination indication based at least on successfully receiving at least one repetition of the set of repetitions. In some cases, the UE 115-c may use the component carrier indicated via the scheduling information received at 405 to transmit the termination indication (e.g., the UE 115-c receives and terminates the repetitions on the same component carrier). In some other cases, UE 115-c may use a second component carrier of the component carrier group indicated via the scheduling information received at 405 to transmit the termination indication (e.g., the UE 115-c receives and terminates the repetitions on different component carriers).

In some cases, the UE 115-c may transmit a second control signaling indicating the termination indication. In some examples, the UE 115-c may determine to transmit the second control signaling indicating the termination indication based on a channel estimate or decoding capability. For example, the UE 115-c may determine to transmit the termination indication based on determining a respective LLR for each received repetition of the set of repetitions and at least one LLR of a received repetition satisfying a threshold LLR value. In some cases, the UE 115-c may successfully decode the data transmission after receiving the at least one repetition based on an estimation of the LLR quality which may be determined based on the at least one LLR of the received repetition satisfying the threshold LLR value. Additionally, or alternatively, the UE 115-c may transmit the second control signaling based on a power level of the UE 115-c satisfying a threshold power level value (e.g., above or below the threshold power level value). In some examples, if the power level of the UE 115-c is below the threshold power level (e.g., the UE 115-c may have a relatively low power value), the UE 115-c may refrain from receiving the remaining repetitions for a duration related to the threshold power level. For example, the UE 115-c may refrain from receiving the repetitions from the network entity 105-c until the power level value of the UE 115-c is above the threshold power level value.

At 420, the network entity 105-c may terminate or cancel the reception of the remaining portion of the set of repetitions based on the UE 115-c transmitting the termination indication. In some cases, subsequent to the network entity 105-c terminating the remaining portion of the set of repetitions, the UE 115-c may transmit a feedback message (e.g., HARQ-ACK message) during one or more resources non-overlapping with the one or more second resources. The feedback message may indicate whether the UE 115-c has successfully decoded the one or more received repetitions from the set of repetitions. In some examples, the UE 115-c may transmit an ACK message as the termination indication indicating that the UE 115-c has decoded the repetitions prior to receiving the full set of repetitions from the network entity 105-c. In some other examples, the UE 115-c may wait until the UE 115-c has received all the repetitions or until after receiving the termination indication to decode the received repetitions. In some cases, subsequent to transmitting the termination indication and decoding the received repetitions, the UE 115-c may transmit the feedback message indicating an ACK if the UE 115-c successfully decoded the repetitions or a NACK if the UE 115-c was not able to decode the repetitions.

At 425, in some cases, the termination indication may indicate that the UE 115-c may use the remaining portion of the repetitions (e.g., the remaining one or more first resources or the remaining repetitions) for energy harvesting, communicating with an energy harvesting device, or for communications with another device. In some examples, the UE 115-c may use the remaining portion of the repetitions for energy harvesting and may harvest the energy of the remaining repetitions. In some other examples, the UE 115-c may use the remaining portion of the repetitions to communicate with an energy harvesting device. In some cases, if the UE 115-c is a power providing device, the UE 115-c may use the remaining resources from the one or more first resources, reserved for receiving the set of repetitions, to send energy to an energy harvesting device. Additionally, or alternatively, the UE 115-c may use the remaining resources from the one or more first resources, reserved for receiving the set of repetitions, to communicate with another UE 115 or another wireless device (e.g., such as an ambient IoT or zero power device). That is, the UE 115-c may use the remaining downlink resources, reserved for receiving the set of repetitions, for communications with the other UE 115 or the other wireless device. In such examples, the termination indication may also indicate transmission parameters for using the remaining portion of the set or repetitions. For example, the transmission parameters may include a beamforming parameter, a precoder value, a QCL value, a transmit value, or any combination thereof. In some cases, if the UE 115-c is using the remaining repetitions for energy harvesting purposes, the network entity 105-c may use the new transmission parameters to reconfigure the remaining repetitions to better support energy harvesting. In some other cases, the UE 115-c may use the transmission parameters for communication with other UEs 115 or other wireless devices.

Figure 5:
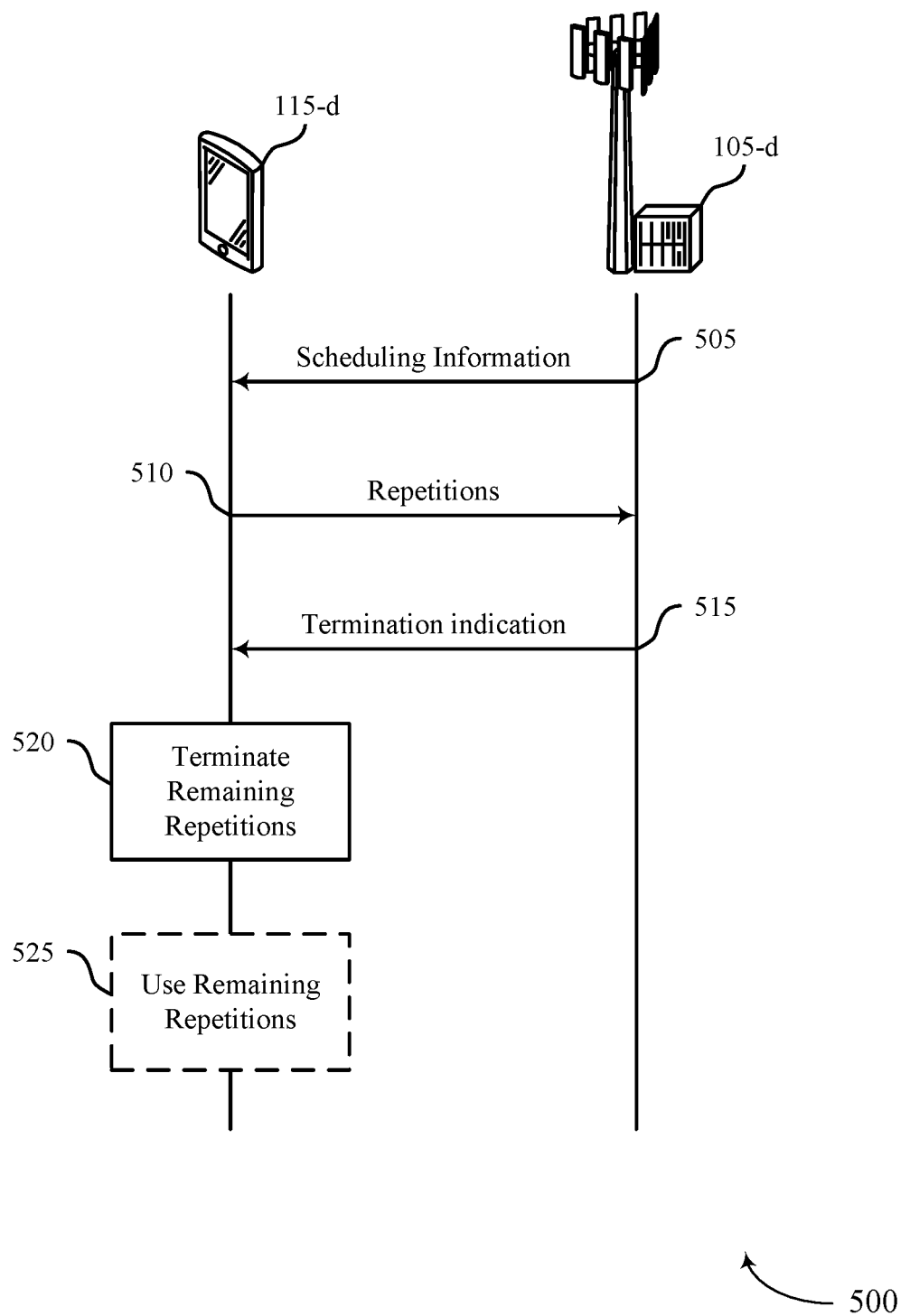

FIG. 5 illustrates an example of a process flow 500 that supports early termination of repetitions in accordance with one or more aspects of the present disclosure. In some examples, the process flow 500 may implement or be implemented by the wireless communications system 100 or the wireless communications system 200. For example, the process flow 500 may include a UE 115-d and a network entity 105-d, which may represent examples of corresponding devices described herein. In this example, the UE 115-d may transmit repetitions of a data transmission to the network entity 105-d based on a scheduling transmitted by the network entity 105-d.

In the following description of the process flow 500, the operations between the UE 115-d and the network entity 105-d may be performed in different orders or at different times. Some operations may also be left out of the process flow 500, or other operations may be added. Although the UE 115-d and the network entity 105-d are shown performing the operations of the process flow 500, some aspects of some operations may also be performed by one or more other wireless devices.

At 505, the UE 115-d may receive a first control signaling from the network entity 105-d including scheduling information indicating one or more first resources in a time domain for the UE 115-d to transmit a set of repetitions of a channel. The scheduling information may also indicate one or more second resources in the time domain for the UE 115-d to receive a termination indication from the network entity 105-d related to the set of repetitions. In some cases, the first control signaling may also indicate a component carrier or a component carrier group for the network entity 105-d to transmit the termination indication on.

At 510, the UE 115-d may transmit at least one repetition of the set of repetitions to the network entity 105-d during at least one resource from the one or more first resources indicated by the scheduling information at 505. In some cases, the UE 115-d may transmit the repetition using the component carrier indicated via the scheduling information or a first component carrier of the component carrier group indicated via the scheduling information at 505.

At 515, the network entity 105-d may transmit the termination indication to the UE 115-d during the one or more second resources and prior to a termination of the one or more first resources (e.g., resources reserved for the UE 115-d to transmit and the network entity 105-d to receive the set of repetitions). The network entity 105-d may determine to transmit the termination indication based at least on successfully receiving at least one repetition of the set of repetitions from the UE 115-d. In some cases, the network entity 105-d may use the component carrier indicated via the scheduling information to transmit the termination indication (e.g., the network entity 105-d receives and terminates the repetitions on the same component carrier). In some other cases, the network entity 105-d may use a second component carrier of the component carrier group indicated via the scheduling information at 505 to transmit the termination indication (e.g., the network entity 105-d receives and terminates the repetitions on different component carriers).

In some examples, the network entity 105-d may transmit a second control signaling indicating the termination indication. In some cases, the network entity 105-d may determine to transmit the second control signaling indicating the termination indication based on a channel estimate or decoding capability. For example, the network entity 105-d may determine to transmit the termination indication based on determining a respective LLR for each received repetition of the set of repetitions and at least one LLR of a received repetition satisfying a threshold LLR value. In some cases, the network entity 105-d may successfully decode the data transmission after receiving the at least one repetition based on an estimation of the LLR quality which may be determined based on the at least one LLR of the received repetition satisfying the threshold LLR value. Additionally, or alternatively, the network entity 105-*d* may transmit the second control signaling based on a power level of the network entity 105-*d* satisfying a threshold power level value (e.g., above or below the threshold power level value). In some examples, the network entity 105-*d* may transmit the second control signaling based on a power level value of the UE 115-*d*. For example, if the power level of the UE 115-*d* is below the threshold power level (e.g., the UE 115-*d* may have a relatively low power value), the network entity 105-*d* may transmit the termination indication and the UE 115-*d* may refrain from transmitting the remaining repetitions for a duration related to the threshold power level to support power savings at the UE 115-*d*. As such, the UE 115-*d* may refrain from transmitting the repetitions to the network entity 105-*d* until the power level value of the UE 115-*d* is above the threshold power level value. Once the power level of the UE 115-*d* is above the threshold power level value, the UE 115-*d* may indicate such information to the network entity 105-*d*, and the network entity 105-*d* may transmit a message to the UE 115-*d* to resume transmission of the repetitions.

In some cases, the UE 115-*d* may receive the second control signaling indicating the termination indication from the network entity 105-*d* in accordance with a transmission format. The transmission format may include a HARQ-ID and one or more resource elements. In some examples, the UE 115-*d* may receive the second control signaling in accordance with the same transmission format as the first control signaling (e.g., the first control signaling and the second control signaling may share the same HARQ-ID). In some other examples, the UE 115-*d* may receive the second control signaling in accordance with a different transmission format than the first control signaling (e.g., the first control signaling and the second control signaling may have different HARQ-IDs).

At 520, the UE 115-*d* may terminate or cancel the reception of the remaining portion of the set of repetitions based on the network entity 105-*d* transmitting the termination indication. In some cases, subsequent to the UE 115-*d* terminating the remaining portion of the set of repetitions, the network entity 105-*d* may transmit a feedback message (e.g., HARQ-ACK message) during one or more second resources non-overlapping with the one or more second resources. The feedback message may indicate whether the network entity 105-*d* has successfully decoded the one or more received repetitions from the set of repetitions. In some examples, the network entity 105-*d* may transmit an ACK message as the termination indication indicating that the network entity 105-*d* has decoded the repetitions prior to receiving the full set of repetitions from the UE 115-*d*. In some other examples, the network entity 105-*d* may wait until the network entity 105-*d* has received all the repetitions or until after receiving the termination indication to decode the received repetitions. In some cases, subsequent to transmitting the termination indication and decoding the received repetitions, the network entity 105-*d* may transmit the feedback message indicating an ACK if the network entity 105-*d* successfully decoded the repetitions or a NACK if the network entity 105-*d* was not able to decode the repetitions.

At 525, in some cases, the termination indication from the network entity 105-*d* may indicate that the UE 115-*d* may use the remaining portion of the repetitions (e.g., the remaining one or more first resources or the remaining repetitions) for energy harvesting, communicating with an energy harvesting device, or for communications with another device. In some examples, the UE 115-*d* may use the remaining portion of the repetitions for energy harvesting and may harvest the energy of the remaining repetitions. In some other examples, the UE 115-*d* may use the remaining portion of the repetitions to communicate with an energy harvesting device. In some cases, if the UE 115-*d* is a power providing device, the UE 115-*d* may use the remaining resources from the one or more first resources, reserved for receiving the set of repetitions, to send energy to an energy harvesting device. Additionally, or alternatively, the UE 115-*d* may use the remaining resources from the one or more first resources, reserved for receiving the set of repetitions, to communicate with another UE 115 or another wireless device. In some examples, the UE 115-*d* may use the remaining resources for sidelink communications. That is, the UE 115-*d* may use the remaining uplink resources, reserved for transmitting the set of repetitions, for sidelink communications with another UE 115. In such examples, the termination indication from the network entity 105-*d* may also indicate transmission parameters for using the remaining portion of the set or repetitions. For example, the transmission parameters may include a beamforming parameter, a precoder value, a QCL value, a transmit value, or any combination thereof. In such cases, the UE 115-*d* may use the transmission parameters to communicate with other UEs 115 in sidelink communications or to communicate with other wireless devices (e.g., energy harvesting devices).

Figure 6:
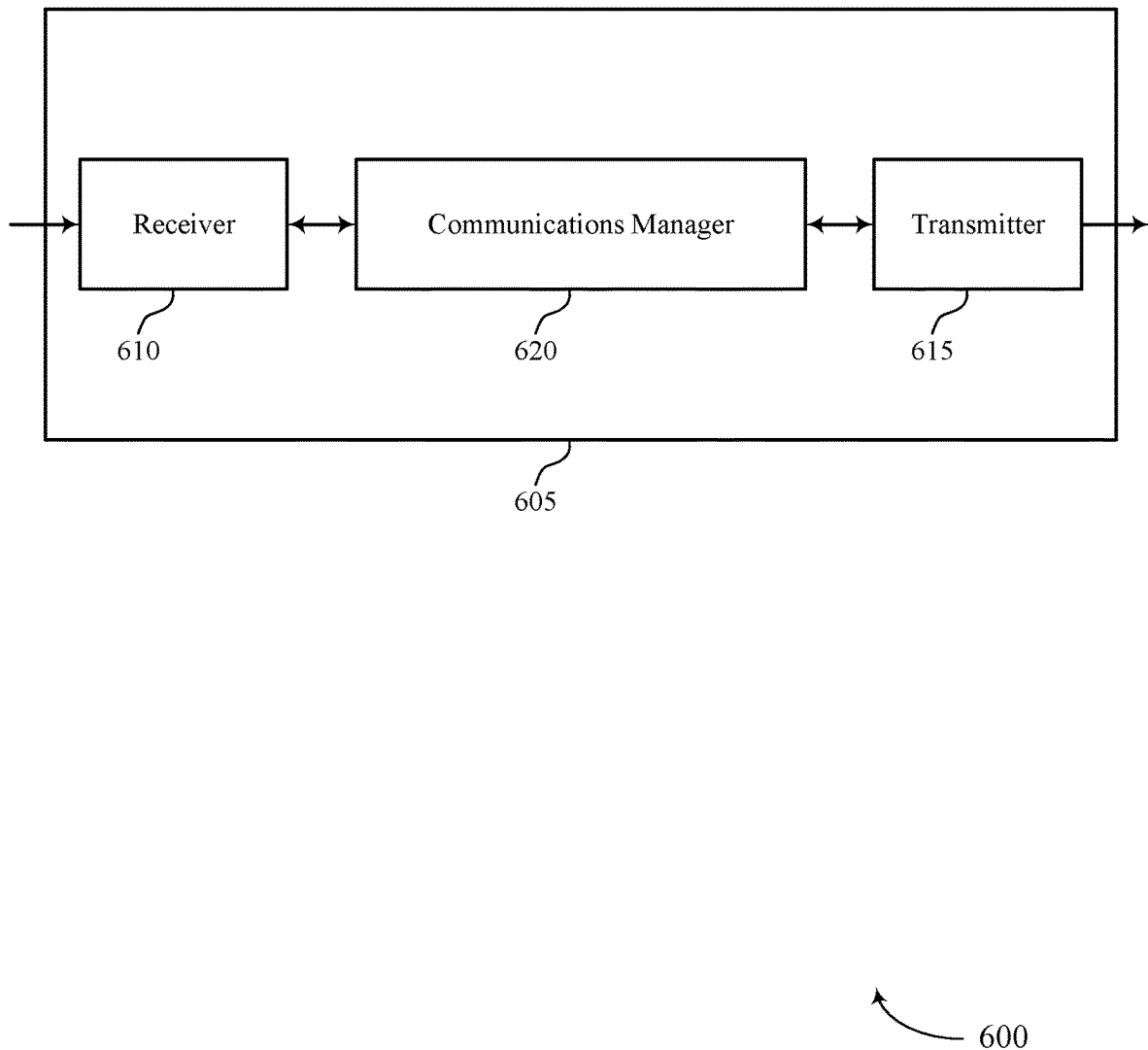
FIGS. 6 and 7 illustrate block diagrams of devices that support early termination of repetitions in accordance with one or more aspects of the present disclosure.

FIG. 6 illustrates a block diagram 600 of a device 605 that supports early termination of repetitions in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to early termination of repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to early termination of repetitions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of early termination of repetitions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The communications manager 620 may be configured as or otherwise support a means for transmitting or receiving, during at least one resource of the one or more first resources, at least one repetition of the set of multiple repetitions. The communications manager 620 may be configured as or otherwise support a means for transmitting or receiving, during the one or more second resources and prior to a termination of the one or more first resources, the termination indication based on successfully transmitting or receiving the at least one repetition of the set of multiple repetitions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a UE 115 or a network entity 105 to terminate the transmission of repetition, which may provide for reduced processing, reduced power consumption, and more efficient utilization of communication resources.

Figure 7:
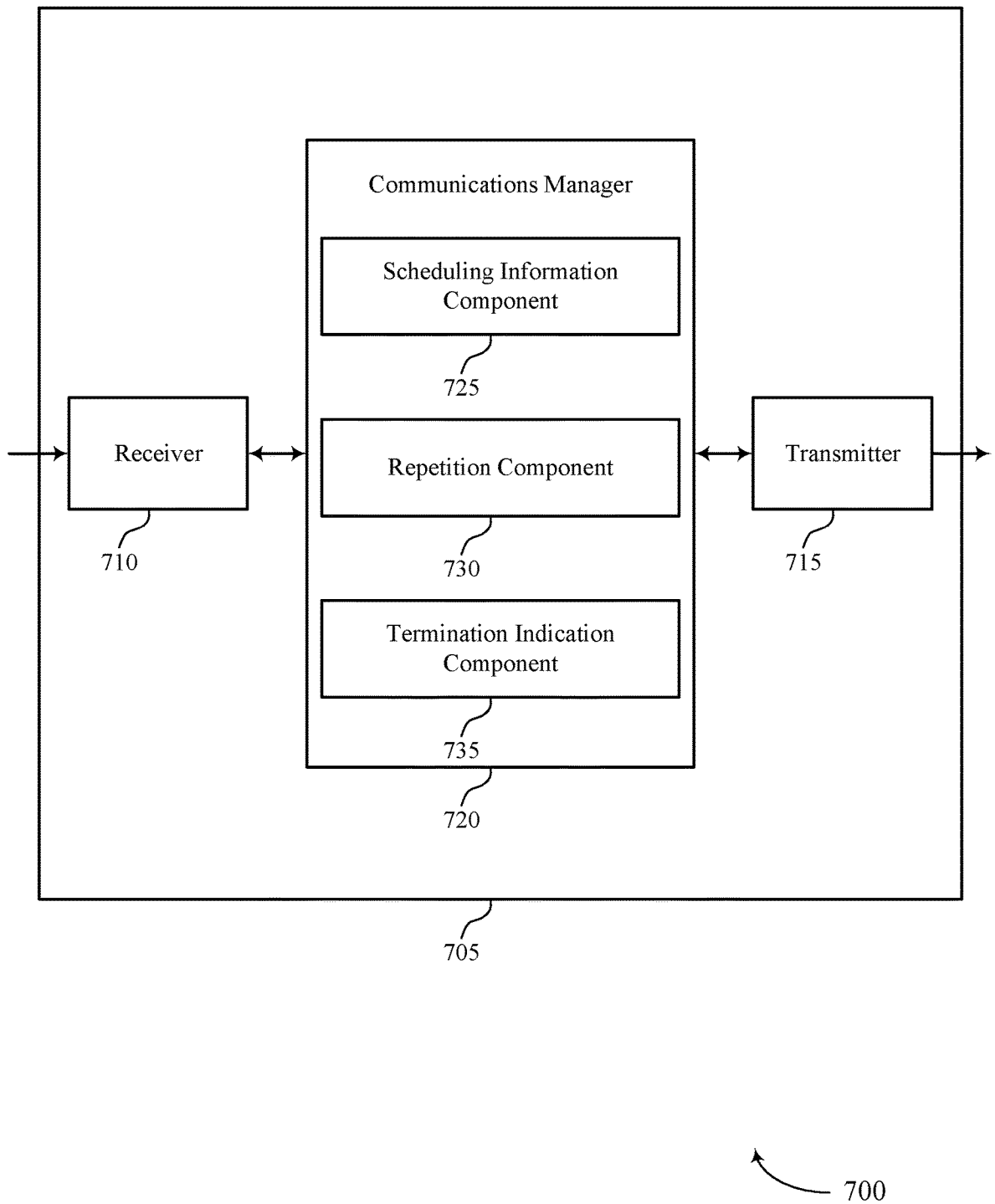

FIG. 7 illustrates a block diagram 700 of a device 705 that supports early termination of repetitions in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to early termination of repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to early termination of repetitions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of early termination of repetitions as described herein. For example, the communications manager 720 may include a scheduling information component 725, a repetition component 730, a termination indication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The scheduling information component 725 may be configured as or otherwise support a means for receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The repetition component 730 may be configured as or otherwise support a means for transmitting or receiving, during at least one resource of the one or more first resources, at least one repetition of the set of multiple repetitions. The termination indication component 735 may be configured as or otherwise support a means for transmitting or receiving, during the one or more second resources and prior to a termination of the one or more first resources, the termination indication based on successfully transmitting or receiving the at least one repetition of the set of multiple repetitions.

Figure 8:
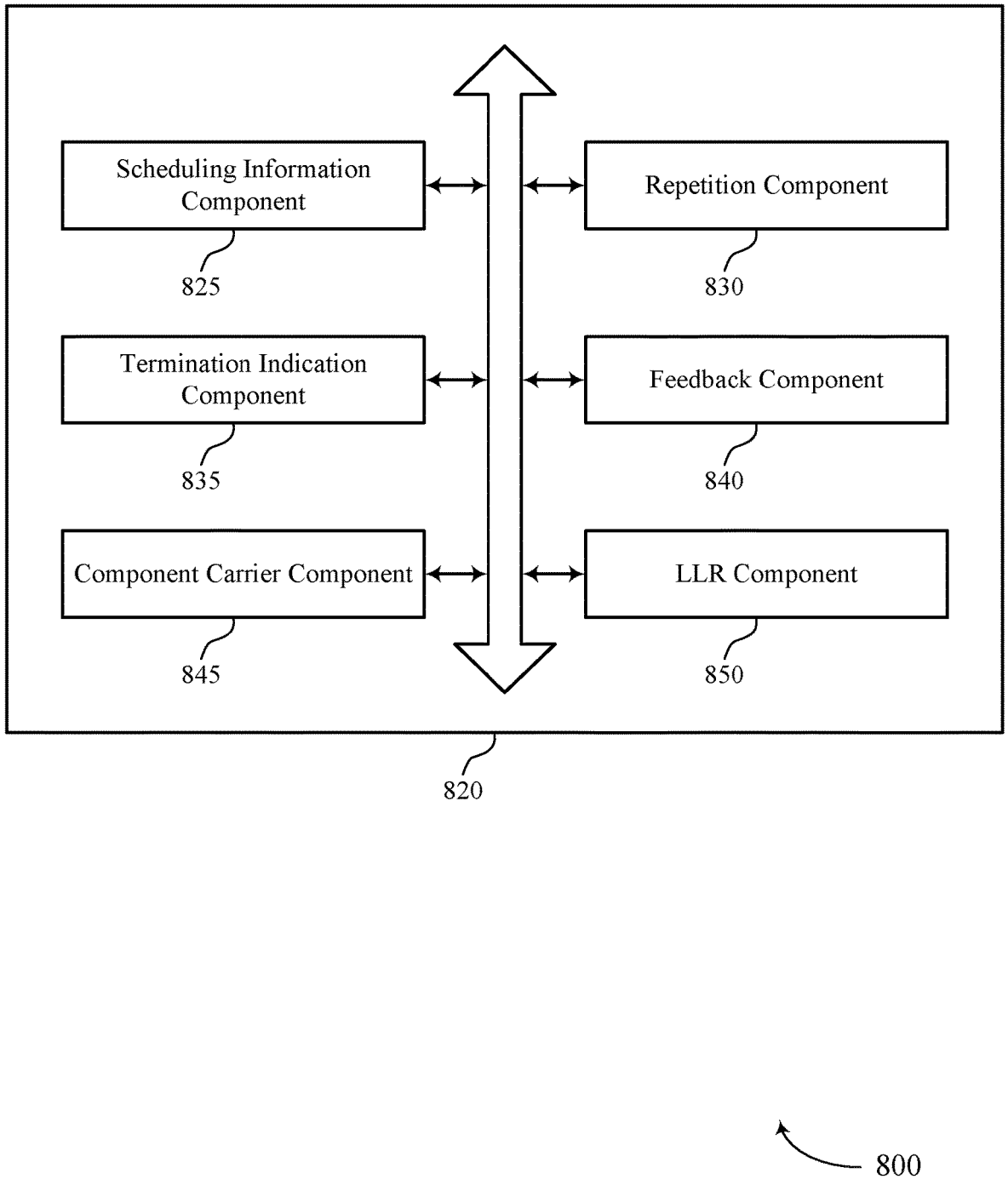
FIG. 8 illustrates a block diagram of a communications manager that supports early termination of repetitions in accordance with one or more aspects of the present disclosure.

FIG. 8 illustrates a block diagram 800 of a communications manager 820 that supports early termination of repetitions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of early termination of repetitions as described herein. For example, the communications manager 820 may include a scheduling information component 825, a repetition component 830, a termination indication component 835, a feedback component 840, a component carrier component 845, an LLR component 850, or any combination thereof. Each of these components may communicate, directly or indirectly, with one another (e.g., via one or more buses).

The communications manager 820 may support wireless communication at a UE in accordance with examples as disclosed herein. The scheduling information component 825 may be configured as or otherwise support a means for receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The repetition component 830 may be configured as or otherwise support a means for transmitting or receiving, during at least one resource of the one or more first resources, at least one repetition of the set of multiple repetitions. The termination indication component 835 may be configured as or otherwise support a means for transmitting or receiving, during the one or more second resources and prior to a termination of the one or more first resources, the termination indication based on successfully transmitting or receiving the at least one repetition of the set of multiple repetitions.

In some examples, the feedback component 840 may be configured as or otherwise support a means for transmitting or receiving, during one or more resources non-overlapping in the time domain with the one or more second resources, a feedback message associated with transmitting or receiving the at least one repetition.

In some examples, the set of multiple repetitions are uplink repetitions and, to support transmitting or receiving the termination indication, the termination indication component 835 may be configured as or otherwise support a means for receiving second control signaling including the termination indication in accordance with a transmission format, where the transmission format includes a HARQ-ID and one or more resource elements.

In some examples, the second control signaling is received in accordance with a same transmission format as the first control signaling.

In some examples, the second control signaling is received in accordance with a different transmission format than the first control signaling.

In some examples, the set of multiple repetitions are downlink repetitions and, to support transmitting or receiving the termination indication, the termination indication component 835 may be configured as or otherwise support a means for transmitting second control signaling including the termination indication.

In some examples, the LLR component 850 may be configured as or otherwise support a means for determining respective LLRs for the set of multiple repetitions, where successfully transmitting or receiving the at least one repetition is based on an estimation associated with an LLR corresponding to the at least one repetition satisfying a threshold value.

In some examples, transmitting the second control signaling is based on a power level of the UE satisfying a threshold power level value.

In some examples, the 855 may be configured as or otherwise support a means for refraining from transmitting or receiving a repetition of the set of multiple repetitions for a duration corresponding to the threshold power level value.

In some examples, the termination indication indicates that the UE is to use a remaining portion of the set of multiple repetitions for energy harvesting, communicating with an energy harvesting device, or both.

In some examples, the termination indication indicates that the UE is to use a remaining portion of the set of multiple repetitions for communications.

In some examples, the termination indication includes transmission parameters corresponding to a remaining portion of the set of multiple repetitions, the transmission parameters including a beamforming parameter, a precoder value, a QCL value, a transmit power, or any combination thereof.

In some examples, to support receiving the first control signaling, the component carrier component 845 may be configured as or otherwise support a means for receiving an indication of a component carrier or a component carrier group associated with transmitting or receiving the termination indication.

In some examples, the component carrier component 845 may be configured as or otherwise support a means for transmitting or receiving the at least one repetition using a first component carrier of the component carrier group. In some examples, the component carrier component 845 may be configured as or otherwise support a means for transmitting or receiving the termination indication using a second component carrier of the component carrier group.

In some examples, the component carrier component 845 may be configured as or otherwise support a means for transmitting or receiving the at least one repetition using the component carrier. In some examples, the component carrier component 845 may be configured as or otherwise support a means for transmitting or receiving the termination indication using the component carrier.

Figure 9:
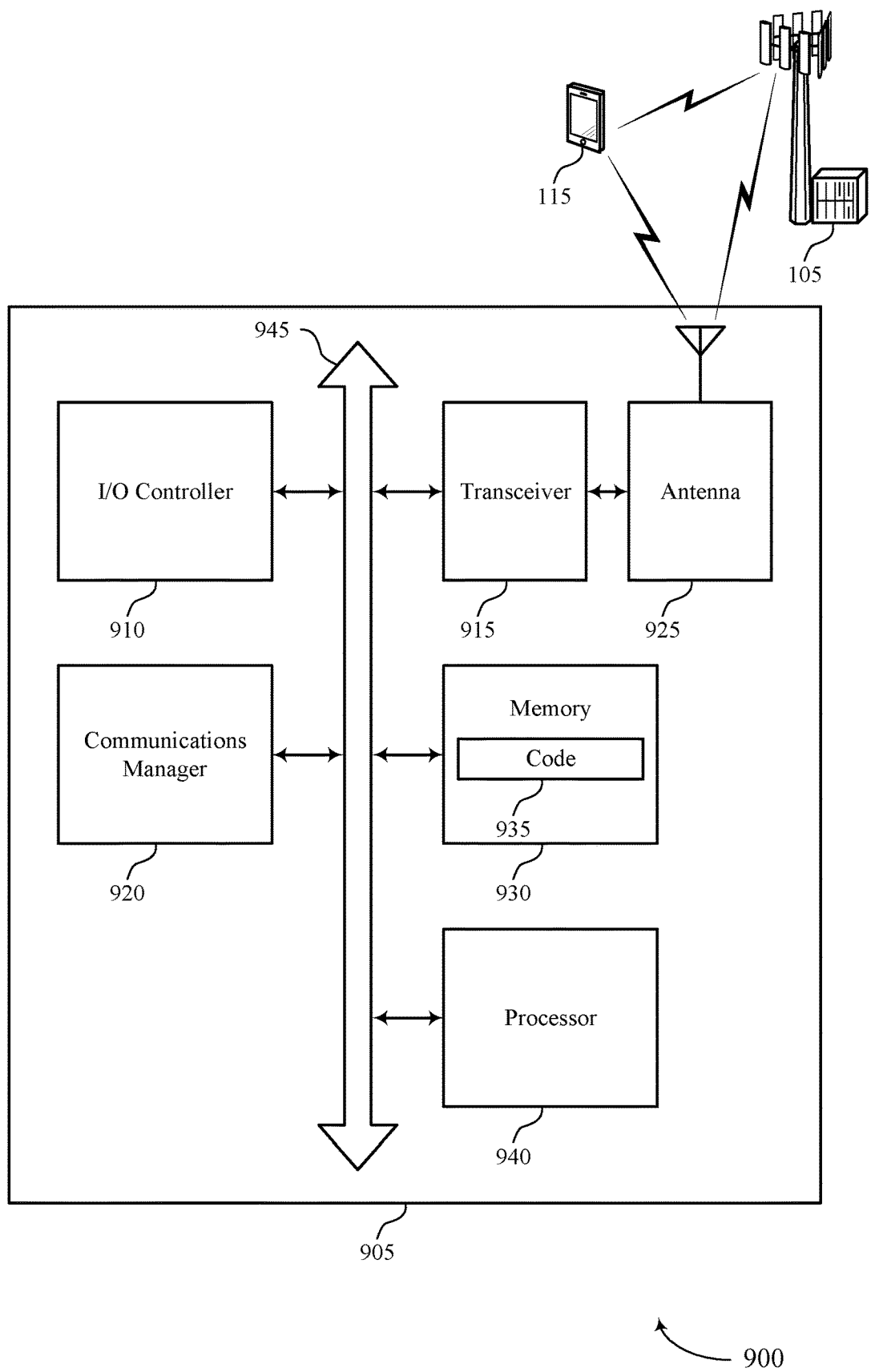
FIG. 9 illustrates a diagram of a system including a device that supports early termination of repetitions in accordance with one or more aspects of the present disclosure.

FIG. 9 illustrates a diagram of a system 900 including a device 905 that supports early termination of repetitions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting early termination of repetitions). For example, the device 905 or a component of the device 905 may include at least one processor 940 and memory 930 coupled with or to the at least one processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The communications manager 920 may be configured as or otherwise support a means for transmitting or receiving, during at least one resource of the one or more first resources, at least one repetition of the set of multiple repetitions. The communications manager 920 may be configured as or otherwise support a means for transmitting or receiving, during the one or more second resources and prior to a termination of the one or more first resources, the termination indication based on successfully transmitting or receiving the at least one repetition of the set of multiple repetitions.

By including or configuring the communications manager 920 in accordance with examples as described herein, the device 905 may support techniques for a UE 115 or a network entity 105 to terminate the transmission of repetition, which may provide for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 (e.g., directly, indirectly, after pre-processing, without pre-processing) to cause the device 905 to perform various aspects of early termination of repetitions as described herein, or the processor 940 and the memory 930 may be otherwise configured to perform or support such operations.

Figure 10:
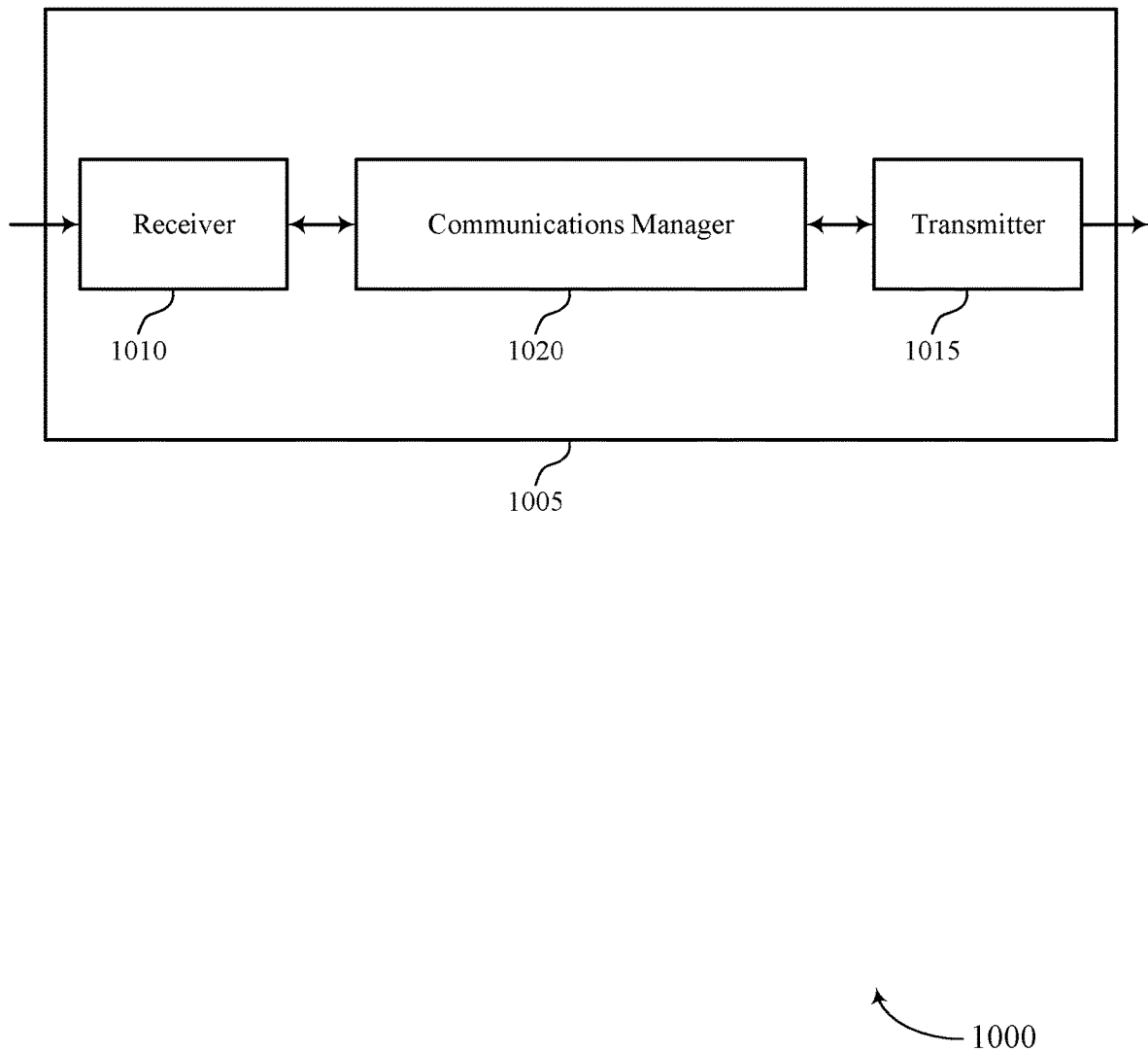
FIGS. 10 and 11 illustrate block diagrams of devices that support early termination of repetitions in accordance with one or more aspects of the present disclosure.

FIG. 10 illustrates a block diagram 1000 of a device 1005 that supports early termination of repetitions in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of early termination of repetitions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and the memory coupled with the at least one processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The communications manager 1020 may be configured as or otherwise support a means for transmitting or receiving, during at least one resource of the one or more first resources, at least one repetition of the set of multiple repetitions. The communications manager 1020 may be configured as or otherwise support a means for transmitting or receiving, during the one or more second resources and prior to the termination of the one or more first resources, the termination indication based on successfully transmitting or receiving the at least one repetition of the set of multiple repetitions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a UE 115 or a network entity 105 to terminate the transmission of repetition, which may provide for reduced processing, reduced power consumption, more efficient utilization of communication resources.

Figure 11:
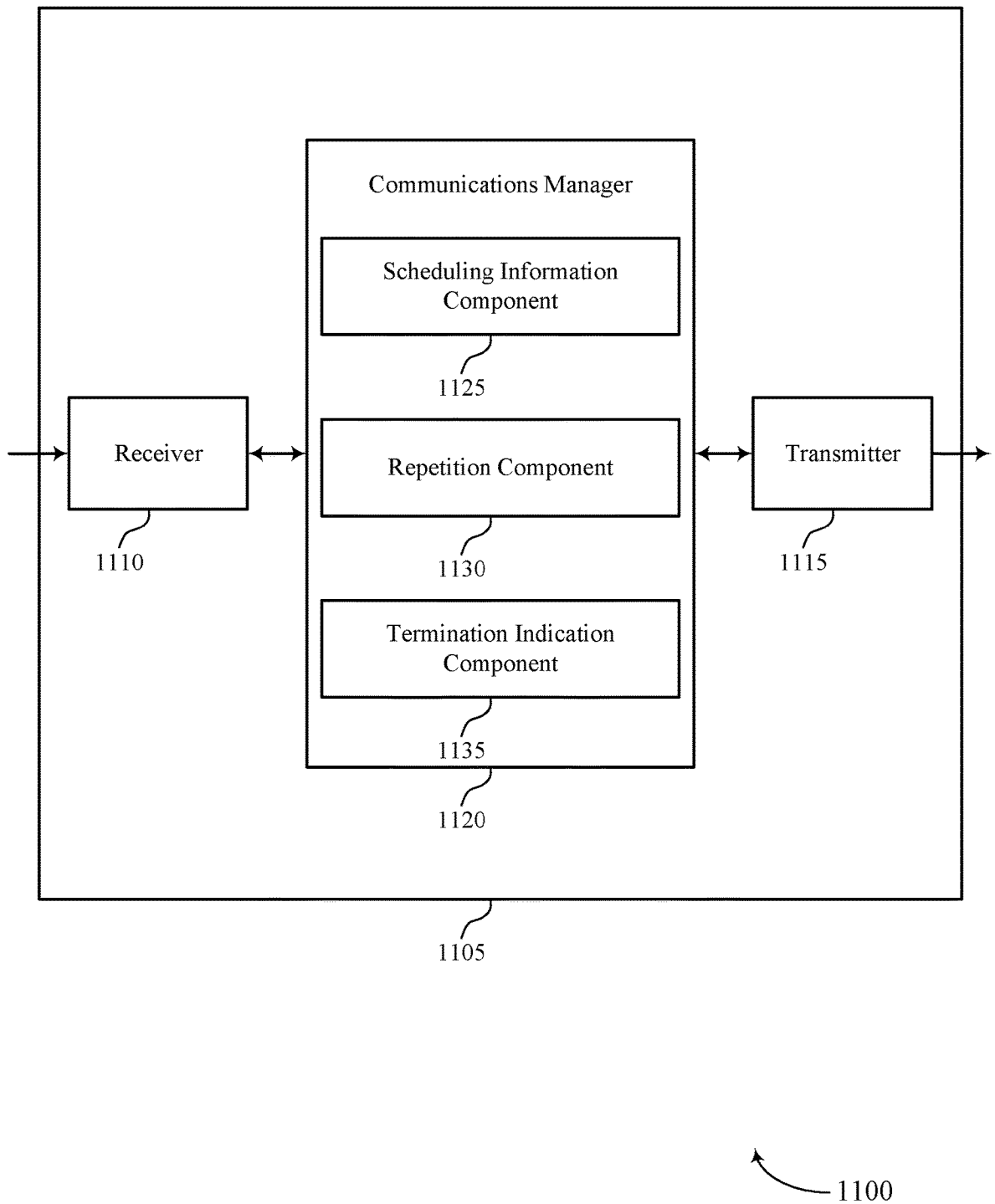

FIG. 11 illustrates a block diagram 1100 of a device 1105 that supports early termination of repetitions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of early termination of repetitions as described herein. For example, the communications manager 1120 may include a scheduling information component 1125, a repetition component 1130, a termination indication component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The scheduling information component 1125 may be configured as or otherwise support a means for transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The repetition component 1130 may be configured as or otherwise support a means for transmitting or receiving, during at least one resource of the one or more first resources, at least one repetition of the set of multiple repetitions. The termination indication component 1135 may be configured as or otherwise support a means for transmitting or receiving, during the one or more second resources and prior to the termination of the one or more first resources, the termination indication based on successfully transmitting or receiving the at least one repetition of the set of multiple repetitions.

Figure 12:
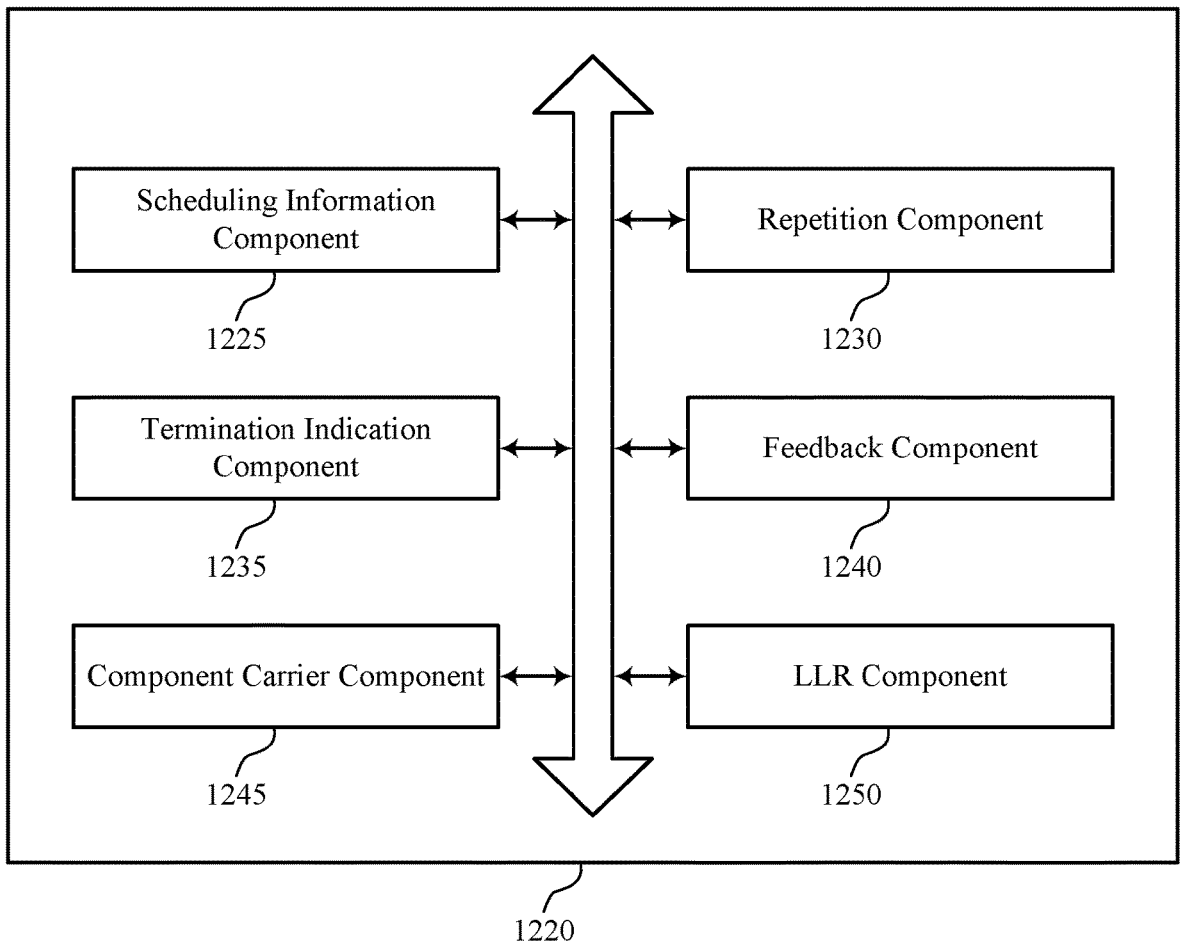
FIG. 12 illustrates a block diagram of a communications manager that supports early termination of repetitions in accordance with one or more aspects of the present disclosure.

FIG. 12 illustrates a block diagram 1200 of a communications manager 1220 that supports early termination of repetitions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of early termination of repetitions as described herein. For example, the communications manager 1220 may include a scheduling information component 1225, a repetition component 1230, a termination indication component 1235, a feedback component 1240, a component carrier component 1245, an LLR component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The scheduling information component 1225 may be configured as or otherwise support a means for transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The repetition component 1230 may be configured as or otherwise support a means for transmitting or receiving, during at least one resource of the one or more first resources, at least one repetition of the set of multiple repetitions. The termination indication component 1235 may be configured as or otherwise support a means for transmitting or receiving, during the one or more second resources and prior to the termination of the one or more first resources, the termination indication based on successfully transmitting or receiving the at least one repetition of the set of multiple repetitions.

In some examples, the feedback component 1240 may be configured as or otherwise support a means for transmitting or receiving, during one or more third resources non-overlapping in the time domain with the one or more second resources, a feedback message associated with transmitting or receiving the at least one repetition.

In some examples, the set of multiple repetitions are uplink repetitions and, to support transmitting or receiving the termination indication, the termination indication component 1235 may be configured as or otherwise support a means for transmitting second control signaling including the termination indication in accordance with a transmission format, where the transmission format includes a HARQ-ID and one or more resource elements.

In some examples, the LLR component 1250 may be configured as or otherwise support a means for determining respective LLRs for the set of multiple repetitions, where successfully transmitting or receiving the at least one repetition is based on an estimation associated with an LLR corresponding to the at least one repetition satisfying a threshold value.

In some examples, the second control signaling is transmitted in accordance with a same transmission format as the first control signaling.

In some examples, the second control signaling is transmitted in accordance with a different transmission format than the first control signaling.

In some examples, the set of multiple repetitions are downlink repetitions and, to support transmitting or receiving the termination indication, the termination indication component 1235 may be configured as or otherwise support a means for receiving second control signaling including the termination indication.

In some examples, the termination indication indicates that the UE is to use a remaining portion of the set of multiple repetitions for energy harvesting, communicating with an energy harvesting device, or both.

In some examples, the termination indication indicates that the UE is to use a remaining portion of the set of multiple repetitions for communications.

In some examples, the termination indication includes transmission parameters corresponding to a remaining portion of the set of multiple repetitions, the transmission parameters including a beamforming parameter, a precoder value, a QCL value, a transmit power, or any combination thereof.

In some examples, to support transmitting the first control signaling, the component carrier component 1245 may be configured as or otherwise support a means for transmitting an indication of a component carrier or a component carrier group associated with transmitting or receiving the termination indication.

In some examples, the component carrier component 1245 may be configured as or otherwise support a means for transmitting or receiving the at least one repetition using a first component carrier of the component carrier group. In some examples, the component carrier component 1245 may be configured as or otherwise support a means for transmitting or receiving the termination indication using a second component carrier of the component carrier group.

In some examples, the component carrier component 1245 may be configured as or otherwise support a means for transmitting or receiving the at least one repetition using the component carrier. In some examples, the component carrier component 1245 may be configured as or otherwise support a means for transmitting or receiving the termination indication using the component carrier.

Figure 13:
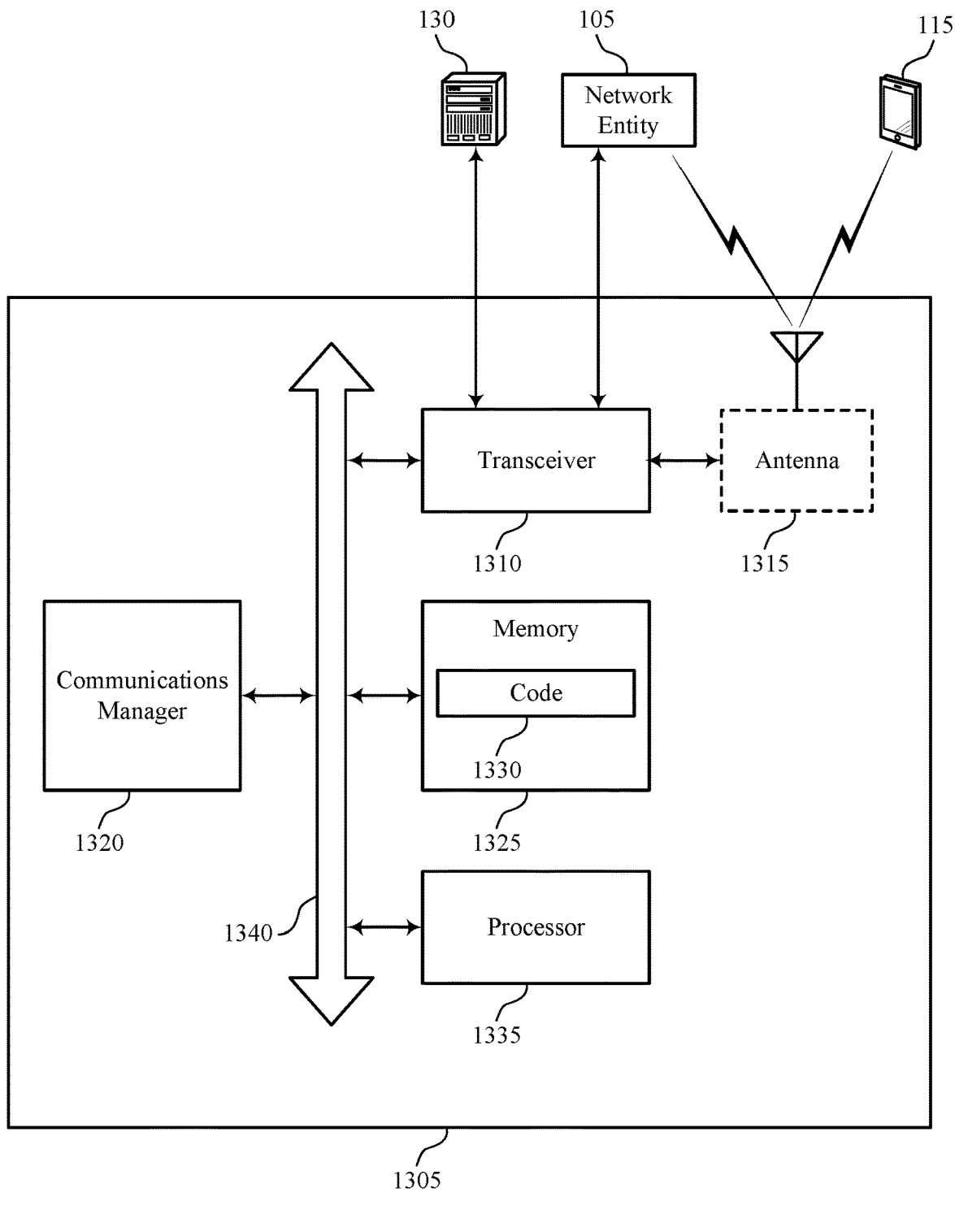
FIG. 13 illustrates a diagram of a system including a device that supports early termination of repetitions in accordance with one or more aspects of the present disclosure.

FIG. 13 illustrates a diagram of a system 1300 including a device 1305 that supports early termination of repetitions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting early termination of repetitions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The communications manager 1320 may be configured as or otherwise support a means for transmitting or receiving, during at least one resource of the one or more first resources, at least one repetition of the set of multiple repetitions. The communications manager 1320 may be configured as or otherwise support a means for transmitting or receiving, during the one or more second resources and prior to the termination of the one or more first resources, the termination indication based on successfully transmitting or receiving the at least one repetition of the set of multiple repetitions.

By including or configuring the communications manager 1320 in accordance with examples as described herein, the device 1305 may support techniques for a UE 115 or a network entity 105 to terminate the transmission of repetition, which may provide for improved communication reliability, reduced latency, improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 (e.g., directly, indirectly, after pre-processing, without pre-processing) to cause the device 1305 to perform various aspects of early termination of repetitions as described herein, or the processor 1335 and the memory 1325 may be otherwise configured to perform or support such operations.

Figure 14:
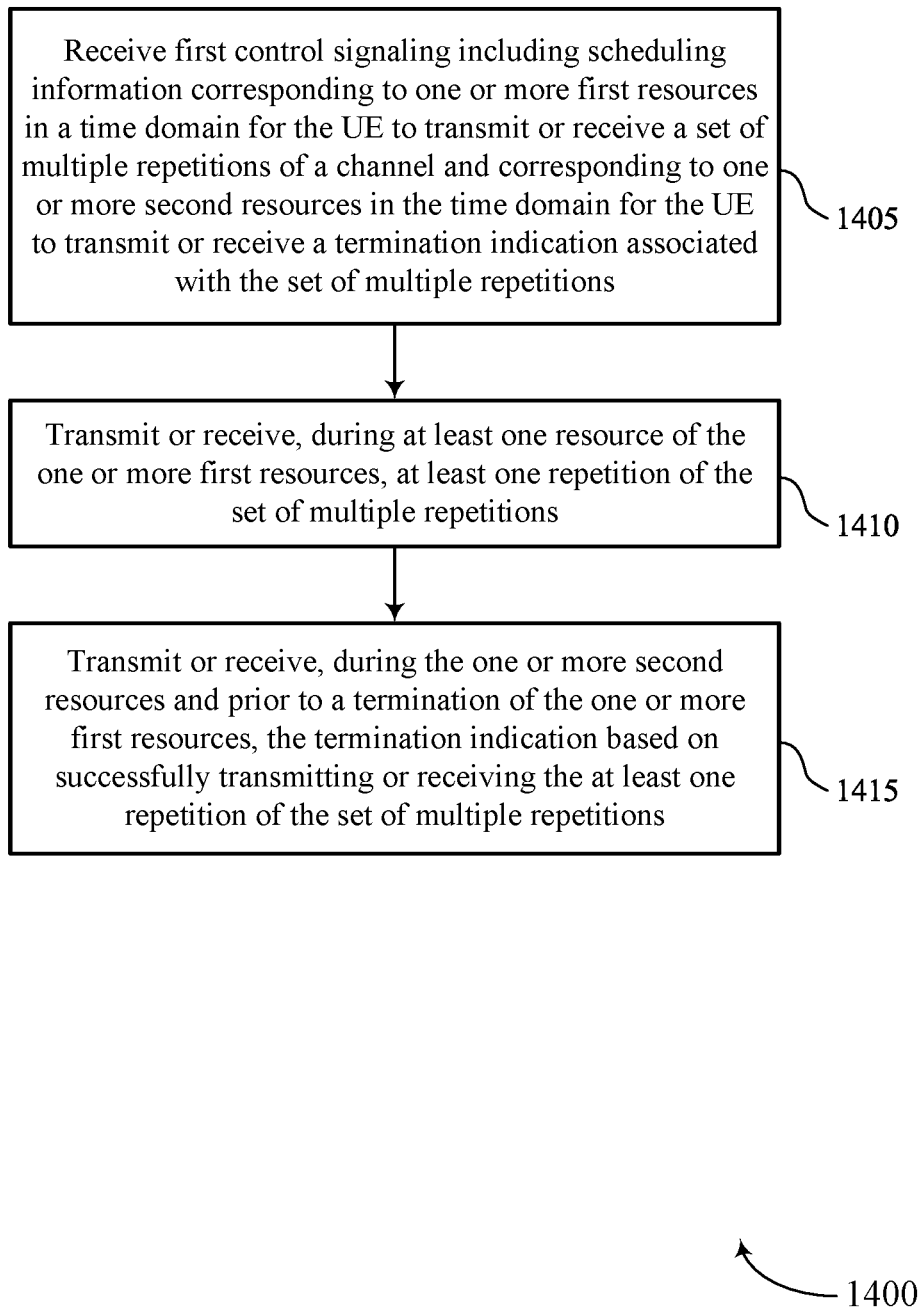
FIGS. 14 through 22 illustrate flowcharts showing methods that support early termination of repetitions in accordance with one or more aspects of the present disclosure.

FIG. 14 illustrates a flowchart showing a method 1400 that supports early termination of repetitions in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The operations of 1405 may be performed in accordance with examples as disclosed herein. In some examples, aspects of the operations of 1405 may be performed by a scheduling information component 825 as described with reference to FIG. 8.

At 1410, the method may include transmitting or receiving, during at least one resource of the one or more first resources, at least one repetition of the set of multiple repetitions. The operations of 1410 may be performed in accordance with examples as disclosed herein. In some examples, aspects of the operations of 1410 may be performed by a repetition component 830 as described with reference to FIG. 8.

At 1415, the method may include transmitting or receiving, during the one or more second resources and prior to a termination of the one or more first resources, the termination indication based on successfully transmitting or receiving the at least one repetition of the set of multiple repetitions. The operations of 1415 may be performed in accordance with examples as disclosed herein. In some examples, aspects of the operations of 1415 may be performed by a termination indication component 835 as described with reference to FIG. 8.

Figure 15:
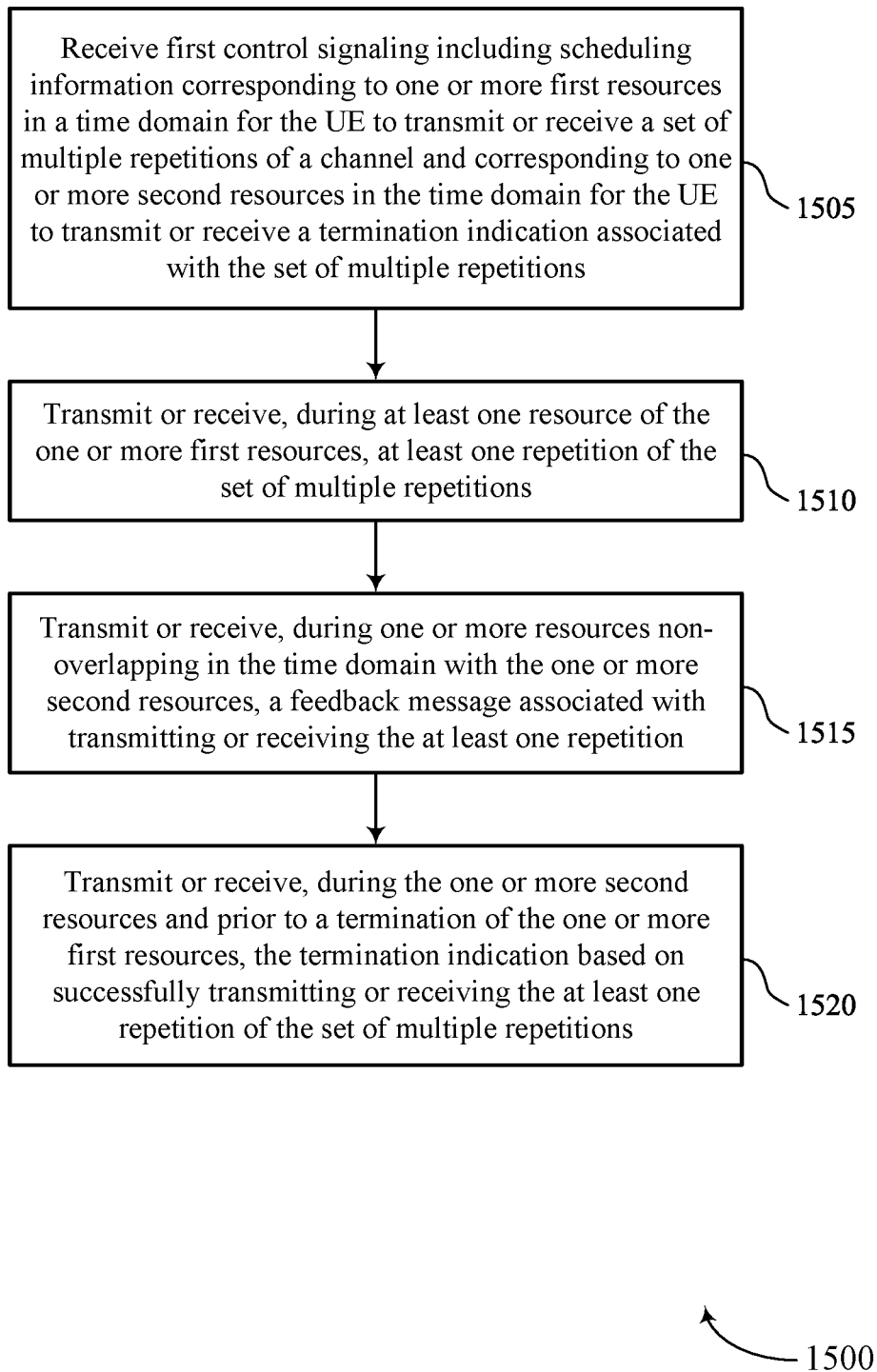

FIG. 15 illustrates a flowchart showing a method 1500 that supports early termination of repetitions in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The operations of 1505 may be performed in accordance with examples as disclosed herein. In some examples, aspects of the operations of 1505 may be performed by a scheduling information component 825 as described with reference to FIG. 8.

At 1510, the method may include transmitting or receiving, during at least one resource of the one or more first resources, at least one repetition of the set of multiple repetitions. The operations of 1510 may be performed in accordance with examples as disclosed herein. In some examples, aspects of the operations of 1510 may be performed by a repetition component 830 as described with reference to FIG. 8.

At 1515, the method may include transmitting or receiving, during one or more resources non-overlapping in the time domain with the one or more second resources, a feedback message associated with transmitting or receiving the at least one repetition. The operations of 1515 may be performed in accordance with examples as disclosed herein. In some examples, aspects of the operations of 1515 may be performed by a feedback component 840 as described with reference to FIG. 8.

At 1520, the method may include transmitting or receiving, during the one or more second resources and prior to a termination of the one or more first resources, the termination indication based on successfully transmitting or receiving the at least one repetition of the set of multiple repetitions. The operations of 1520 may be performed in accordance with examples as disclosed herein. In some examples, aspects of the operations of 1520 may be performed by a termination indication component 835 as described with reference to FIG. 8.

Figure 16:
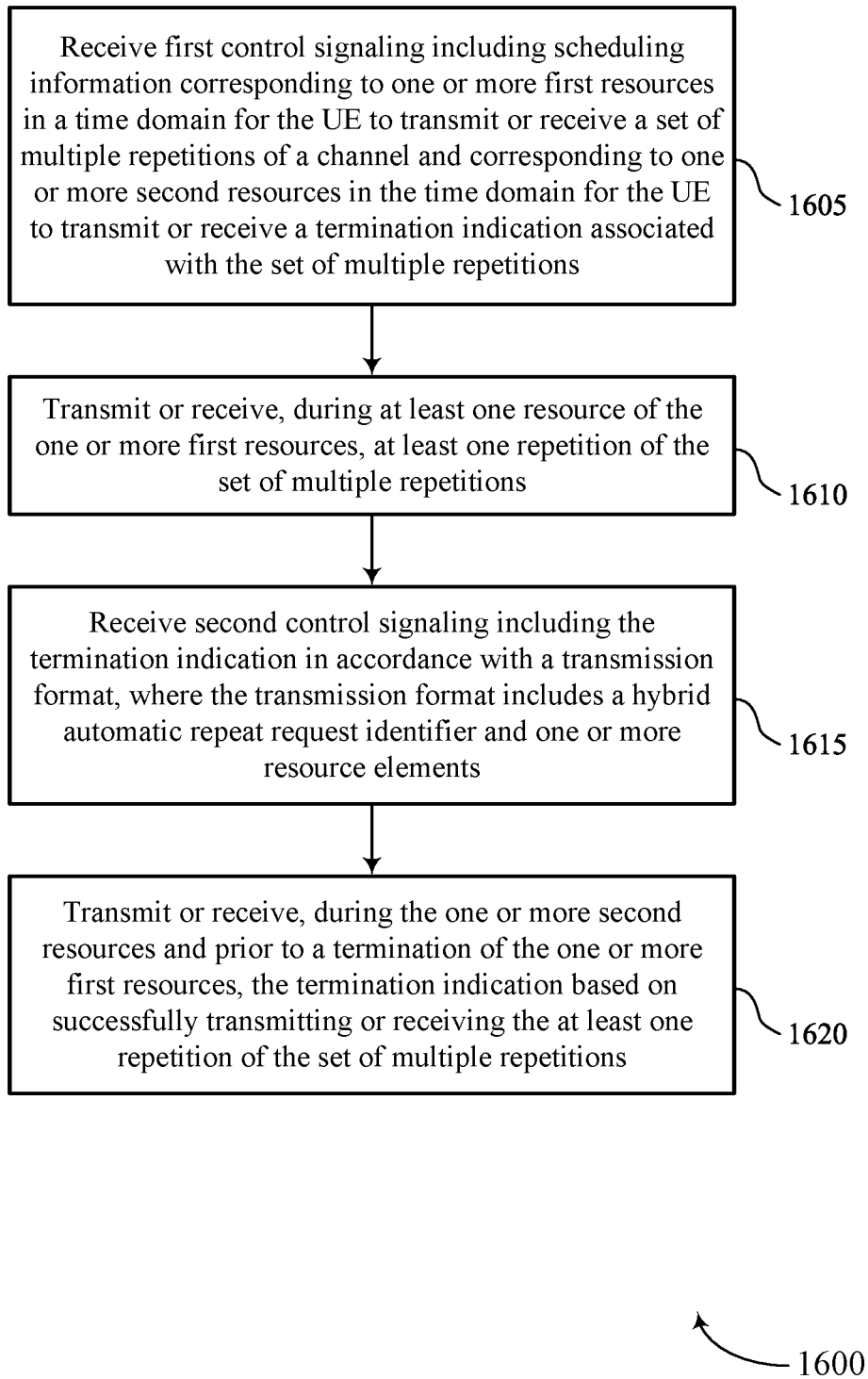

FIG. 16 illustrates a flowchart showing a method 1600 that supports early termination of repetitions in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The operations of 1605 may be performed in accordance with examples as disclosed herein. In some examples, aspects of the operations of 1605 may be performed by a scheduling information component 825 as described with reference to FIG. 8.

At 1610, the method may include transmitting or receiving, during at least one resource of the one or more first resources, at least one repetition of the set of multiple repetitions. The operations of 1610 may be performed in accordance with examples as disclosed herein. In some examples, aspects of the operations of 1610 may be performed by a repetition component 830 as described with reference to FIG. 8.

At 1615, the method may include receiving second control signaling including the termination indication in accordance with a transmission format, where the transmission format includes a HARQ-ID and one or more resource elements. The operations of 1615 may be performed in accordance with examples as disclosed herein. In some examples, aspects of the operations of 1615 may be performed by a termination indication component 835 as described with reference to FIG. 8.

At 1620, the method may include transmitting or receiving, during the one or more second resources and prior to a termination of the one or more first resources, the termination indication based on successfully transmitting or receiving the at least one repetition of the set of multiple repetitions. The operations of 1620 may be performed in accordance with examples as disclosed herein. In some examples, aspects of the operations of 1620 may be performed by a termination indication component 835 as described with reference to FIG. 8.

Figure 17:
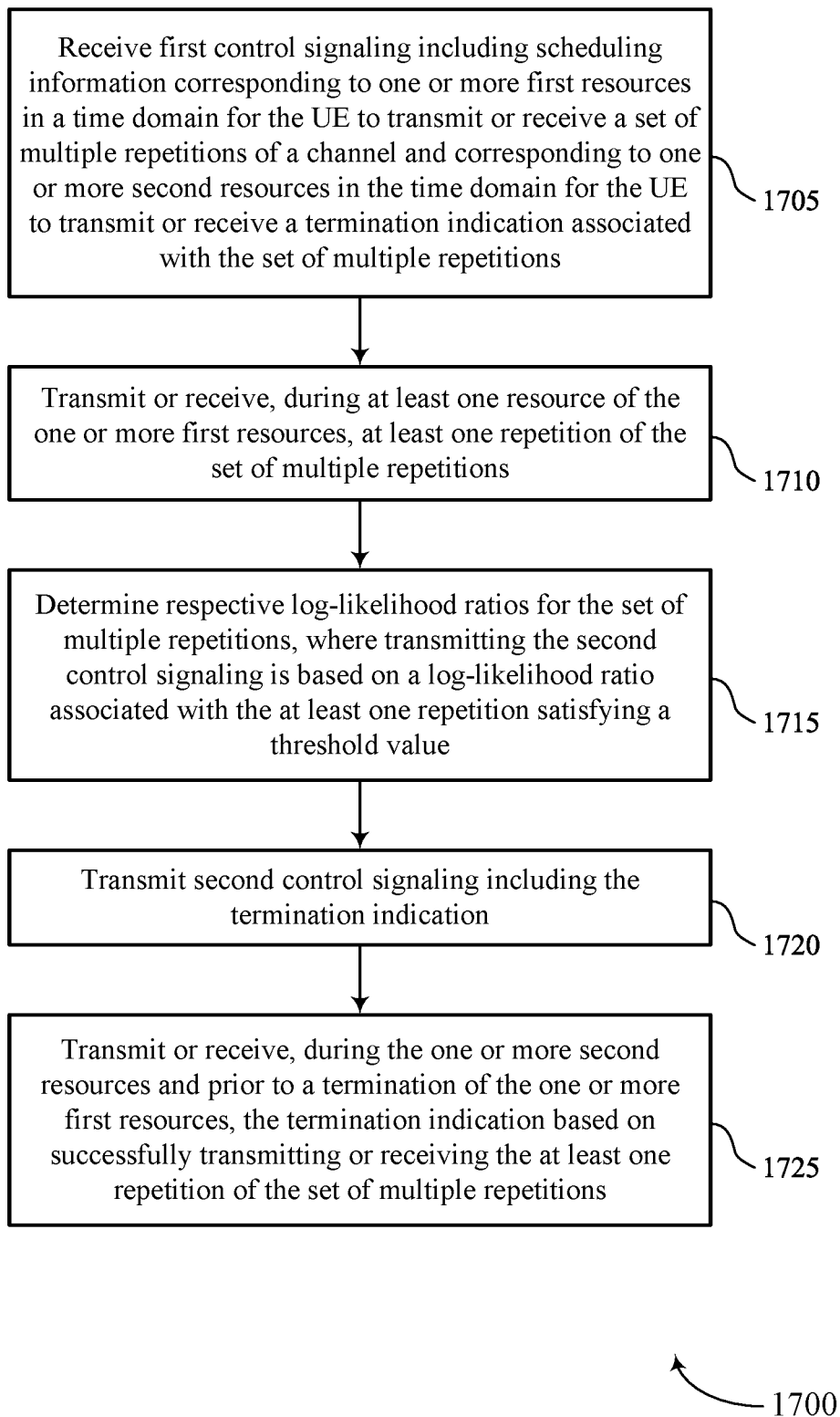

FIG. 17 illustrates a flowchart showing a method 1700 that supports early termination of repetitions in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The operations of 1705 may be performed in accordance with examples as disclosed herein. In some examples, aspects of the operations of 1705 may be performed by a scheduling information component 825 as described with reference to FIG. 8.

At 1710, the method may include transmitting or receiving, during at least one resource of the one or more first resources, at least one repetition of the set of multiple repetitions. The operations of 1710 may be performed in accordance with examples as disclosed herein. In some examples, aspects of the operations of 1710 may be performed by a repetition component 830 as described with reference to FIG. 8.

At 1715, the method may include determining respective LLRs for the set of multiple repetitions, where successfully transmitting or receiving the at least one repetition is based on an estimation associated with an LLR corresponding to the at least one repetition satisfying a threshold value. The operations of 1715 may be performed in accordance with examples as disclosed herein. In some examples, aspects of the operations of 1715 may be performed by an LLR component 850 as described with reference to FIG. 8.

At 1720, the method may include transmitting second control signaling including the termination indication. The operations of 1720 may be performed in accordance with examples as disclosed herein. In some examples, aspects of the operations of 1720 may be performed by a termination indication component 835 as described with reference to FIG. 8.

At 1725, the method may include transmitting or receiving, during the one or more second resources and prior to a termination of the one or more first resources, the termination indication based on successfully transmitting or receiving the at least one repetition of the set of multiple repetitions. The operations of 1725 may be performed in accordance with examples as disclosed herein. In some examples, aspects of the operations of 1725 may be performed by a termination indication component 835 as described with reference to FIG. 8.

Figure 18:
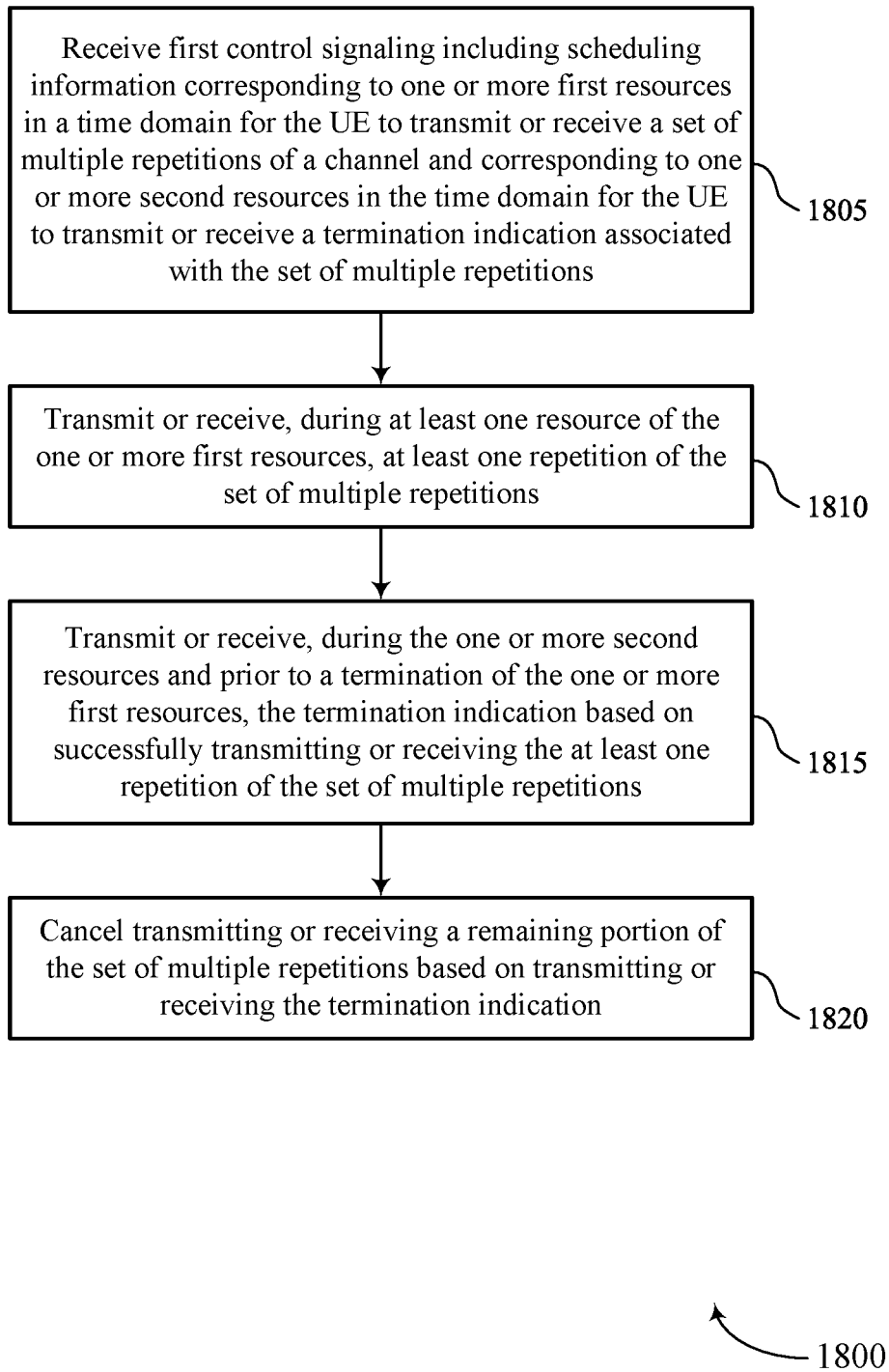

FIG. 18 illustrates a flowchart showing a method 1800 that supports early termination of repetitions in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving first control signaling including scheduling information corresponding to one or more first resources in a time domain for the UE to transmit or receive a set of multiple repetitions of a channel and corresponding to one or more second resources in the time domain for the UE to transmit or receive a termination indication associated with the set of multiple repetitions. The operations of 1805 may be performed in accordance with examples as disclosed herein. In some examples, aspects of the operations of 1805 may be performed by a scheduling information component 825 as described with reference to FIG. 8.

At 1810, the method may include transmitting or receiving, during at least one resource of the one or more first resources, at least one repetition of the set of multiple repetitions. The operations of 1810 may be performed in accordance with examples as disclosed herein. In some examples, aspects of the operations of 1810 may be performed by a repetition component 830 as described with reference to FIG. 8.

At 1815, the method may include transmitting or receiving, during the one or more second resources and prior to a termination of the one or more first resources, the termination indication based on successfully transmitting or receiving the at least one repetition of the set of multiple repetitions. The operations of 1815 may be performed in accordance with examples as disclosed herein. In some examples, aspects of the operations of 1815 may be performed by a termination indication component 835 as described with reference to FIG. 8.

Figure 19:
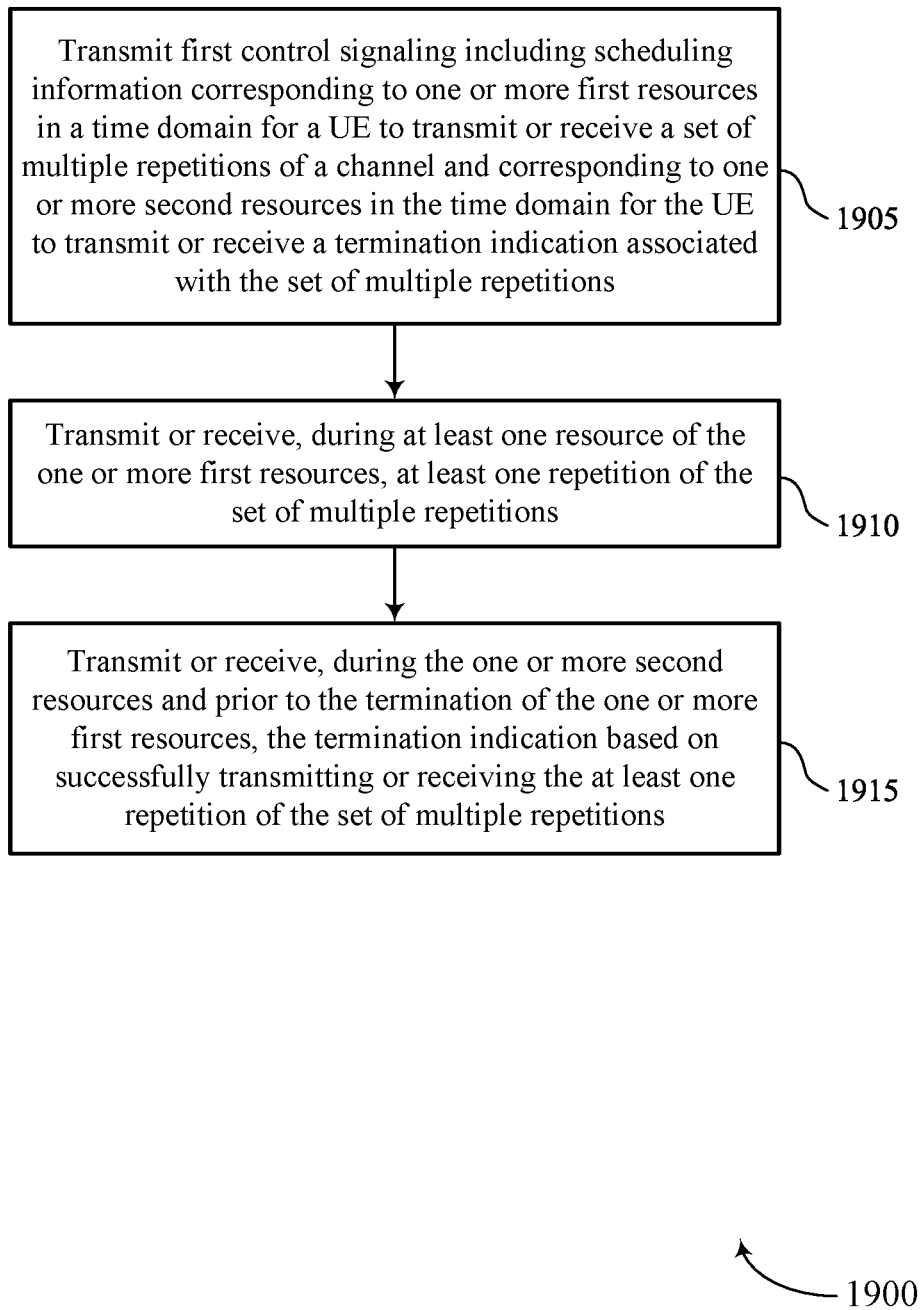

FIG. 19 illustrates a flowchart showing a method 1900 that supports early termination of repetitions in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The operations of 1905 may be performed in accordance with examples as disclosed herein. In some examples, aspects of the operations of 1905 may be performed by a scheduling information component 1225 as described with reference to FIG. 12.

At 1910, the method may include transmitting or receiving, during at least one resource of the one or more first resources, at least one repetition of the set of multiple repetitions. The operations of 1910 may be performed in accordance with examples as disclosed herein. In some examples, aspects of the operations of 1910 may be performed by a repetition component 1230 as described with reference to FIG. 12.

At 1915, the method may include transmitting or receiving, during the one or more second resources and prior to the termination of the one or more first resources, the termination indication based on successfully transmitting or receiving the at least one repetition of the set of multiple repetitions. The operations of 1915 may be performed in accordance with examples as disclosed herein. In some examples, aspects of the operations of 1915 may be performed by a termination indication component 1235 as described with reference to FIG. 12.

Figure 20:
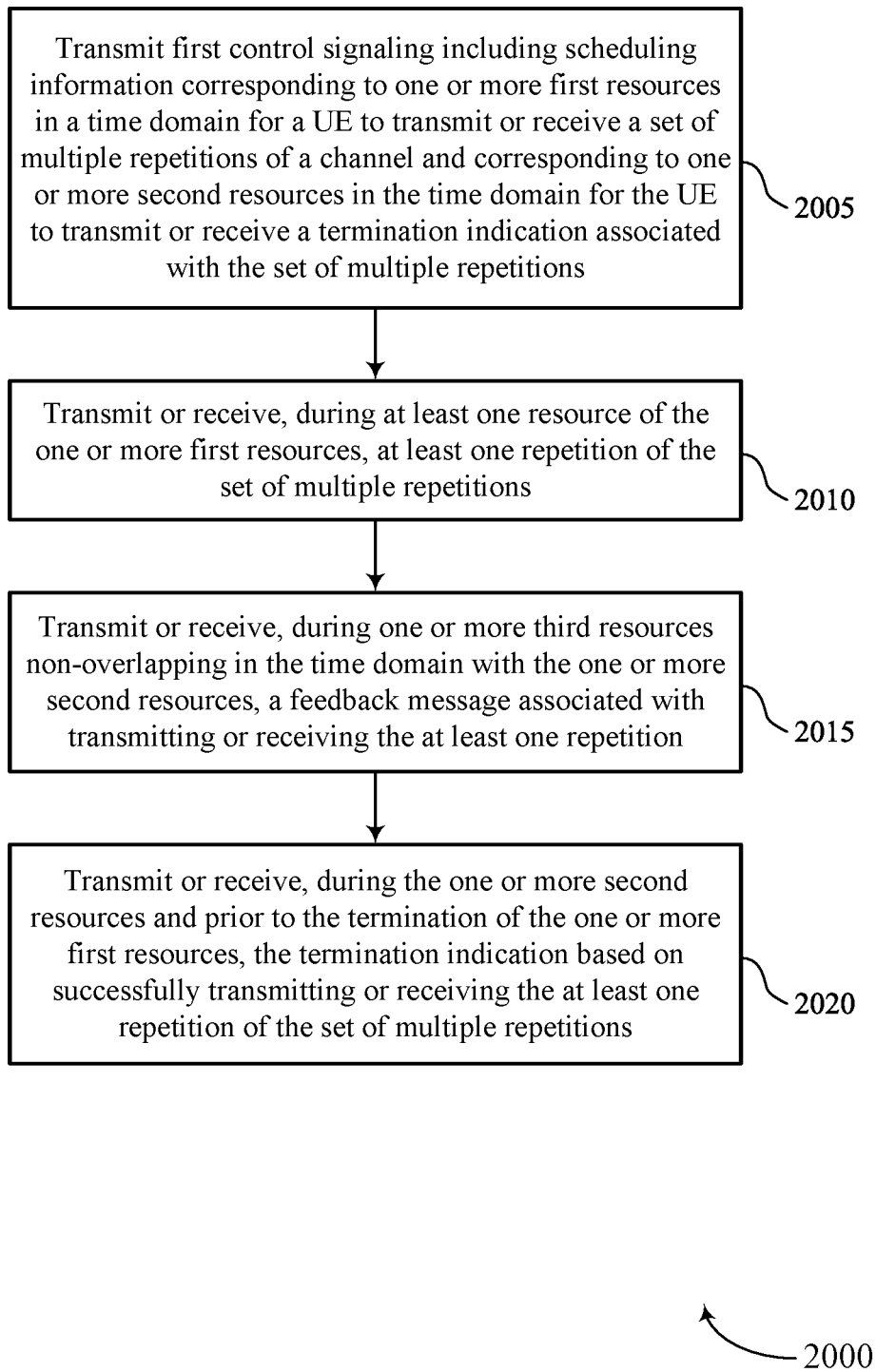

FIG. 20 illustrates a flowchart showing a method 2000 that supports early termination of repetitions in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The operations of 2005 may be performed in accordance with examples as disclosed herein. In some examples, aspects of the operations of 2005 may be performed by a scheduling information component 1225 as described with reference to FIG. 12.

At 2010, the method may include transmitting or receiving, during at least one resource of the one or more first resources, at least one repetition of the set of multiple repetitions. The operations of 2010 may be performed in accordance with examples as disclosed herein. In some examples, aspects of the operations of 2010 may be performed by a repetition component 1230 as described with reference to FIG. 12.

At 2015, the method may include transmitting or receiving, during one or more third resources non-overlapping in the time domain with the one or more second resources, a feedback message associated with transmitting or receiving the at least one repetition. The operations of 2015 may be performed in accordance with examples as disclosed herein. In some examples, aspects of the operations of 2015 may be performed by a feedback component 1240 as described with reference to FIG. 12.

At 2020, the method may include transmitting or receiving, during the one or more second resources and prior to the termination of the one or more first resources, the termination indication based on successfully transmitting or receiving the at least one repetition of the set of multiple repetitions. The operations of 2020 may be performed in accordance with examples as disclosed herein. In some examples, aspects of the operations of 2020 may be performed by a termination indication component 1235 as described with reference to FIG. 12.

Figure 21:
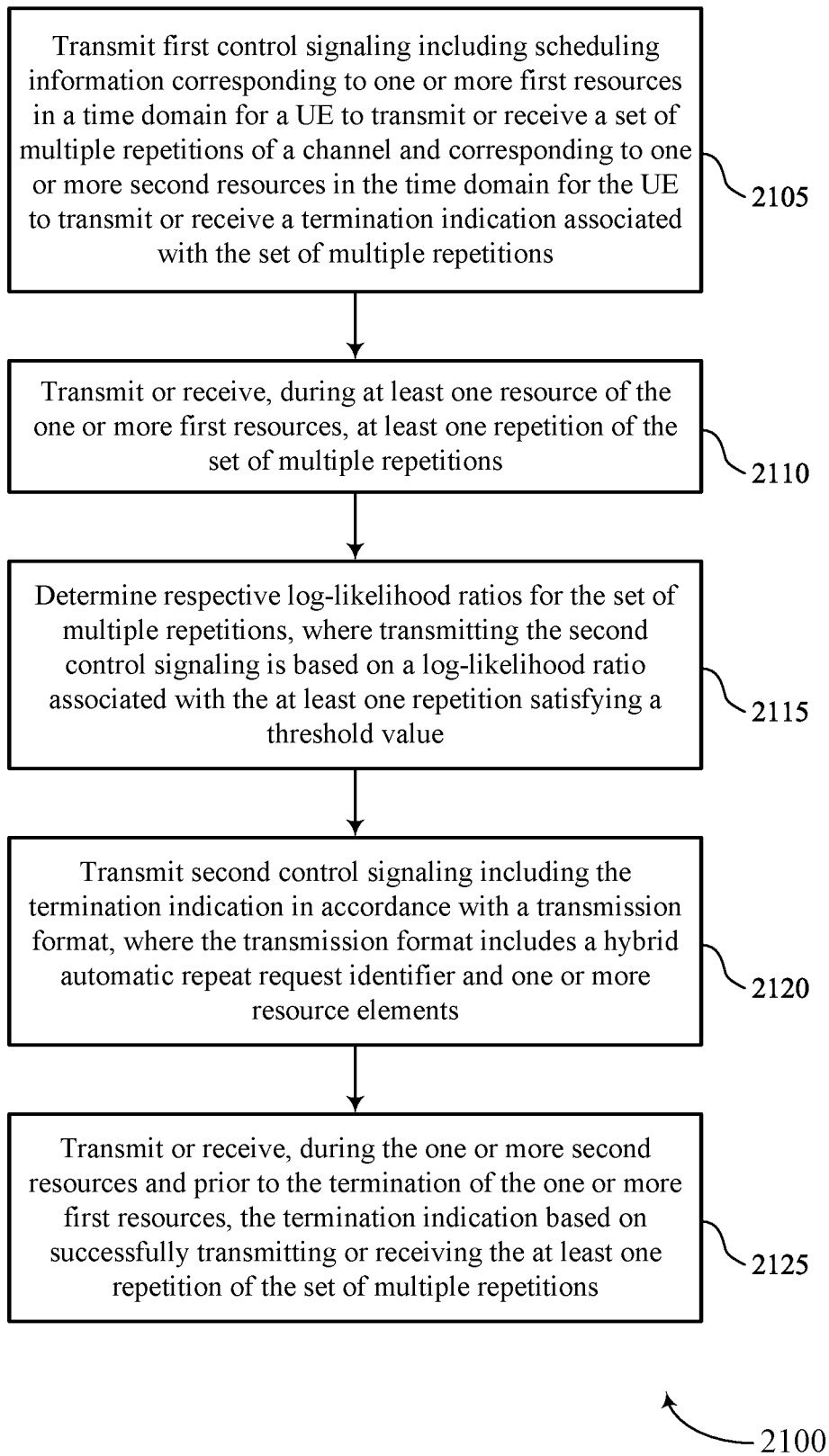

FIG. 21 illustrates a flowchart showing a method 2100 that supports early termination of repetitions in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The operations of 2105 may be performed in accordance with examples as disclosed herein. In some examples, aspects of the operations of 2105 may be performed by a scheduling information component 1225 as described with reference to FIG. 12.

At 2110, the method may include transmitting or receiving, during at least one resource of the one or more first resources, at least one repetition of the set of multiple repetitions. The operations of 2110 may be performed in accordance with examples as disclosed herein. In some examples, aspects of the operations of 2110 may be performed by a repetition component 1230 as described with reference to FIG. 12.

At 2115, the method may include determining respective LLRs for the set of multiple repetitions, where successfully transmitting or receiving the at least one repetition is based on an estimation associated with an LLR corresponding to the at least one repetition satisfying a threshold value. The operations of 2115 may be performed in accordance with examples as disclosed herein. In some examples, aspects of the operations of 2115 may be performed by an LLR component 1250 as described with reference to FIG. 12.

At 2120, the method may include transmitting second control signaling including the termination indication in accordance with a transmission format, where the transmission format includes a HARQ-ID and one or more resource elements. The operations of 2120 may be performed in accordance with examples as disclosed herein. In some examples, aspects of the operations of 2120 may be performed by a termination indication component 1235 as described with reference to FIG. 12.

At 2125, the method may include transmitting or receiving, during the one or more second resources and prior to the termination of the one or more first resources, the termination indication based on successfully transmitting or receiving the at least one repetition of the set of multiple repetitions. The operations of 2125 may be performed in accordance with examples as disclosed herein. In some examples, aspects of the operations of 2125 may be performed by a termination indication component 1235 as described with reference to FIG. 12.

Figure 22:
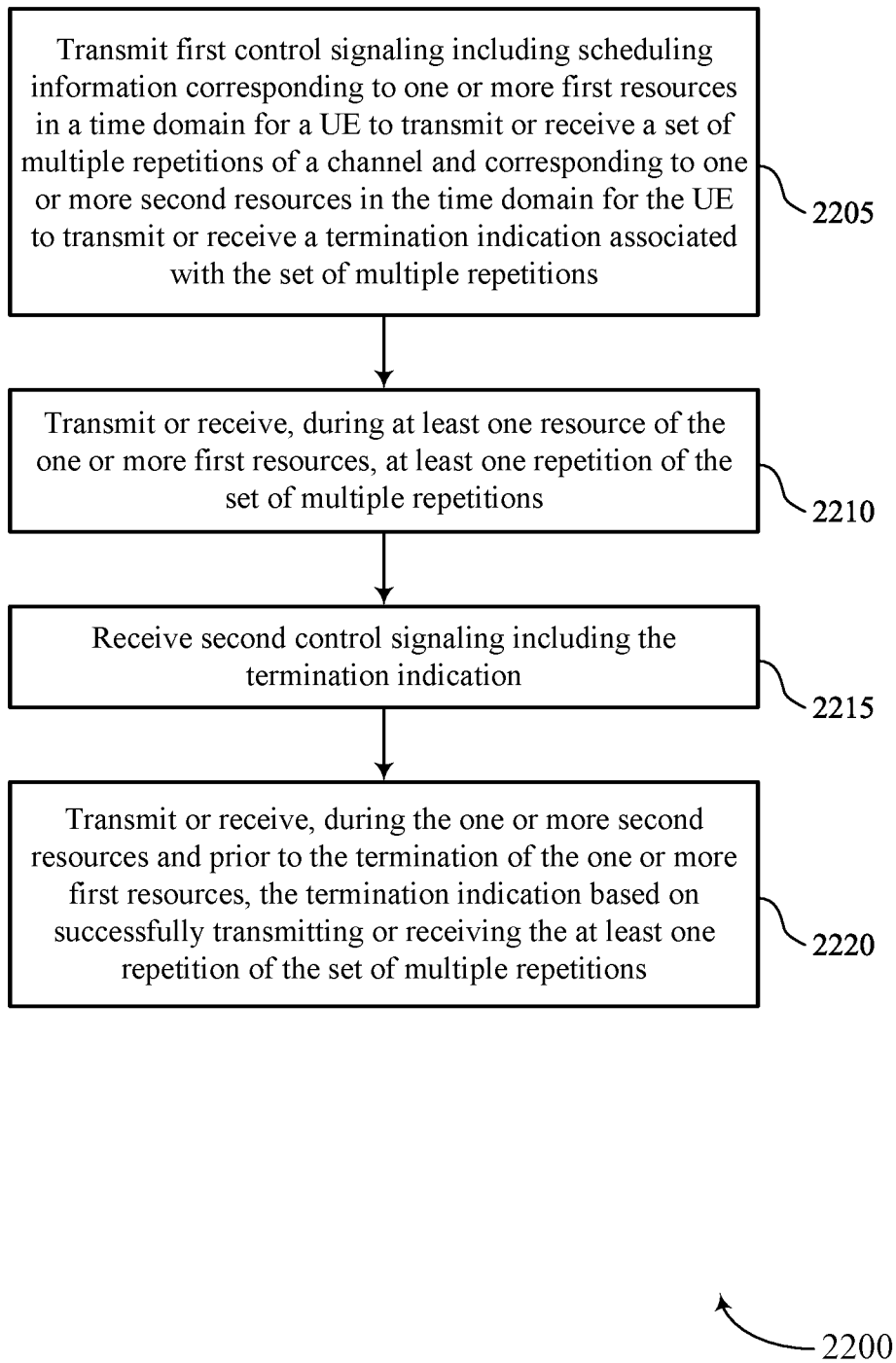

FIG. 22 illustrates a flowchart showing a method 2200 that supports early termination of repetitions in accordance with one or more aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting first control signaling including scheduling information corresponding to one or more first resources in a time domain for a UE to transmit or receive a set of multiple repetitions of a channel and corresponding to one or more second resources in the time domain for the UE to transmit or receive a termination indication associated with the set of multiple repetitions. The operations of 2205 may be performed in accordance with examples as disclosed herein. In some examples, aspects of the operations of 2205 may be performed by a scheduling information component 1225 as described with reference to FIG. 12.

At 2210, the method may include transmitting or receiving, during at least one resource of the one or more first resources, at least one repetition of the set of multiple repetitions. The operations of 2210 may be performed in accordance with examples as disclosed herein. In some examples, aspects of the operations of 2210 may be performed by a repetition component 1230 as described with reference to FIG. 12.

At 2215, the method may include receiving second control signaling including the termination indication. The operations of 2215 may be performed in accordance with examples as disclosed herein. In some examples, aspects of the operations of 2215 may be performed by a termination indication component 1235 as described with reference to FIG. 12.

At 2220, the method may include transmitting or receiving, during the one or more second resources and prior to the termination of the one or more first resources, the termination indication based on successfully transmitting or receiving the at least one repetition of the set of multiple repetitions. The operations of 2220 may be performed in accordance with examples as disclosed herein. In some examples, aspects of the operations of 2220 may be performed by a termination indication component 1235 as described with reference to FIG. 12.

The following provides an overview of aspects of the present disclosure:

Aspect 1: A method for wireless communication at a UE, comprising: receiving first control signaling comprising scheduling information corresponding to one or more first resources in a time domain for the UE to transmit or receive a plurality of repetitions of a channel and corresponding to one or more second resources in the time domain for the UE to transmit or receive a termination indication associated with the plurality of repetitions; transmitting or receiving, during at least one resource of the one or more first resources, at least one repetition of the plurality of repetitions; and transmitting or receiving, during the one or more second resources and prior to a termination of the one or more first resources, the termination indication based at least in part on successfully transmitting or receiving the at least one repetition of the plurality of repetitions.

Aspect 2: The method of aspect 1, further comprising: transmitting or receiving, during one or more resources non-overlapping in the time domain with the one or more second resources, a feedback message associated with transmitting or receiving the at least one repetition.

Aspect 3: The method of any of aspects 1 through 2, wherein the plurality of repetitions are uplink repetitions and transmitting or receiving the termination indication comprises: receiving second control signaling comprising the termination indication in accordance with a transmission format, wherein the transmission format comprises a HARQ-ID and one or more resource elements.

Aspect 4: The method of aspect 3, wherein the second control signaling is received in accordance with a same transmission format as the first control signaling.

Aspect 5: The method of aspect 3, wherein the second control signaling is received in accordance with a different transmission format than the first control signaling.

Aspect 6: The method of any of aspects 1 through 5, wherein the plurality of repetitions are downlink repetitions and transmitting or receiving the termination indication comprises: transmitting second control signaling comprising the termination indication.

Aspect 7: The method of aspect 6, further comprising: determining respective LLRs for the plurality of repetitions, wherein successfully transmitting or receiving the at least one repetition is based at least in part on an estimation associated with a LLR corresponding to the at least one repetition satisfying a threshold value.

Aspect 8: The method of any of aspects 6 through 7, wherein transmitting the second control signaling is based at least in part on a power level of the UE satisfying a threshold power level value.

Aspect 9: The method of aspect 8, further comprising: refraining from transmitting or receiving a repetition of the plurality of repetitions for a duration corresponding to the threshold power level value.

Aspect 10: The method of any of aspects 1 through 9, wherein the termination indication indicates that the UE is to use a remaining portion of the plurality of repetitions for energy harvesting, communicating with an energy harvesting device, or both.

Aspect 11: The method of any of aspects 1 through 9, wherein the termination indication indicates that the UE is to use a remaining portion of the plurality of repetitions for communications.

Aspect 12: The method of any of aspects 1 through 11, wherein the termination indication comprises transmission parameters corresponding to a remaining portion of the plurality of repetitions, the transmission parameters comprising a beamforming parameter, a precoder value, a QCL value, a transmit power, or any combination thereof.

Aspect 13: The method of any of aspects 1 through 12, wherein receiving the first control signaling further comprises: receiving an indication of a component carrier or a component carrier group associated with transmitting or receiving the termination indication.

Aspect 14: The method of aspect 13, further comprising: transmitting or receiving the at least one repetition using a first component carrier of the component carrier group; and transmitting or receiving the termination indication using a second component carrier of the component carrier group.

Aspect 15: The method of any of aspects 13 through 14, further comprising: transmitting or receiving the at least one repetition using the component carrier; and transmitting or receiving the termination indication using the component carrier.

Aspect 16: A method for wireless communication at a network entity, comprising: transmitting first control signaling comprising scheduling information corresponding to one or more first resources in a time domain for a UE to transmit or receive a plurality of repetitions of a channel and corresponding to one or more second resources in the time domain for the UE to transmit or receive a termination indication associated with the plurality of repetitions; transmitting or receiving, during at least one resource of the one or more first resources, at least one repetition of the plurality of repetitions; and transmitting or receiving, during the one or more second resources and prior to the termination of the one or more first resources, the termination indication based at least in part on successfully transmitting or receiving the at least one repetition of the plurality of repetitions.

Aspect 17: The method of aspect 16, further comprising: transmitting or receiving, during one or more third resources non-overlapping in the time domain with the one or more second resources, a feedback message associated with transmitting or receiving the at least one repetition.

Aspect 18: The method of any of aspects 16 through 17, wherein the plurality of repetitions are uplink repetitions and transmitting or receiving the termination indication comprises: transmitting second control signaling comprising the termination indication in accordance with a transmission format, wherein the transmission format comprises a HARQ-ID and one or more resource elements.

Aspect 19: The method of aspect 18, further comprising: determining respective LLRs for the plurality of repetitions, wherein successfully transmitting or receiving the at least one repetition is based at least in part on an estimation associated with a LLR corresponding to the at least one repetition satisfying a threshold value.

Aspect 20: The method of any of aspects 18 through 19, wherein the second control signaling is transmitted in accordance with a same transmission format as the first control signaling.

Aspect 21: The method of aspect 18, wherein the second control signaling is transmitted in accordance with a different transmission format than the first control signaling.

Aspect 22: The method of any of aspects 16 through 21, wherein the plurality of repetitions are downlink repetitions and transmitting or receiving the termination indication comprises: receiving second control signaling comprising the termination indication.

Aspect 23: The method of any of aspects 16 through 22, wherein the termination indication indicates that the UE is to use a remaining portion of the plurality of repetitions for energy harvesting, communicating with an energy harvesting device, or both.

Aspect 24: The method of any of aspects 16 through 22, wherein the termination indication indicates that the UE is to use a remaining portion of the plurality of repetitions for communications.

Aspect 25: The method of any of aspects 16 through 24, wherein the termination indication comprises transmission parameters corresponding to a remaining portion of the plurality of repetitions, the transmission parameters comprising a beamforming parameter, a precoder value, a QCL value, a transmit power, or any combination thereof.

Aspect 26: The method of any of aspects 16 through 25, wherein transmitting the first control signaling further comprises: transmitting an indication of a component carrier or a component carrier group associated with transmitting or receiving the termination indication.

Aspect 27: The method of aspect 26, further comprising: transmitting or receiving the at least one repetition using a first component carrier of the component carrier group; and transmitting or receiving the termination indication using a second component carrier of the component carrier group.

Aspect 28: The method of any of aspects 26 through 27, further comprising: transmitting or receiving the at least one repetition using the component carrier; and transmitting or receiving the termination indication using the component carrier.

Aspect 29: An apparatus for wireless communication at a UE, comprising at least one processor; and memory coupled with the at least one processor, the memory storing instructions executable by the at least one processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by at least one processor to perform a method of any of aspects 1 through 15.

Aspect 32: An apparatus for wireless communication at a network entity, comprising at least one processor; and memory coupled with the at least one processor, the memory storing instructions executable by the at least one processor to cause the apparatus to perform a method of any of aspects 16 through 28.

Aspect 33: An apparatus for wireless communication at a network entity, comprising at least one means for performing a method of any of aspects 16 through 28.

Aspect 34: A non-transitory computer-readable medium storing code for wireless communication at a network entity, the code comprising instructions executable by at least one processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor; and
    memory coupled with the at least one processor, the memory storing instructions executable by the at least one processor to cause the UE to:
        receive first control signaling comprising scheduling information corresponding to one or more first resources in a time domain for the UE to transmit or receive a plurality of repetitions of a channel and corresponding to one or more second resources in the time domain for the UE to transmit or receive a termination indication associated with the plurality of repetitions;
        transmit or receive, during at least one resource of the one or more first resources, at least one repetition of the plurality of repetitions; and
        transmit or receive, during the one or more second resources and prior to a termination of the one or more first resources, the termination indication based at least in part on successfully transmitting or receiving the at least one repetition of the plurality of repetitions.

2. The apparatus of claim 1, wherein the instructions are further executable by the at least one processor to cause the UE to:
    transmit or receive, during one or more resources non-overlapping in the time domain with the one or more second resources, a feedback message associated with transmitting or receiving the at least one repetition.

3. The apparatus of claim 1, wherein the plurality of repetitions are uplink repetitions and the instructions executable by the at least one processor to transmit or receive the termination indication further cause the UE to:
    receive second control signaling comprising the termination indication in accordance with a transmission format, wherein the transmission format comprises a hybrid automatic repeat request identifier and one or more resource elements.

4. The apparatus of claim 3, wherein the second control signaling is received in accordance with a same transmission format as the first control signaling.

5. The apparatus of claim 3, wherein the second control signaling is received in accordance with a different transmission format than the first control signaling.

6. The apparatus of claim 1, wherein the plurality of repetitions are downlink repetitions and the instructions executable by the at least one processor to transmit or receive the termination indication further cause the UE to:
  transmit second control signaling comprising the termination indication.

7. The apparatus of claim 6, wherein the instructions are further executable by the at least one processor to cause the UE to:
  determine respective log-likelihoods for the plurality of repetitions, wherein successfully transmitting or receiving the at least one repetition is based at least in part on an estimate association with a log-likelihood ratio corresponding to the at least one repetition satisfying a threshold value.

8. The apparatus of claim 6, wherein transmitting the second control signaling is based at least in part on a power level of the UE satisfying a threshold power level value.

9. The apparatus of claim 8, wherein the instructions are further executable by the at least one processor to cause the UE to:
  refrain from transmitting or receiving a repetition of the plurality of repetitions for a duration corresponding to the threshold power level value.

10. The apparatus of claim 1, wherein the termination indication indicates that the UE is to use a remaining portion of the plurality of repetitions for energy harvesting, communicating with an energy harvesting device, or both.

11. The apparatus of claim 1, wherein the termination indication indicates that the UE is to use a remaining portion of the plurality of repetitions for communications.

12. The apparatus of claim 1, wherein the termination indication comprises transmission parameters corresponding to a remaining portion of the plurality of repetitions, the transmission parameters comprising a beamforming parameter, a precoder value, a quasi-colocation value, a transmit power, or any combination thereof.

13. The apparatus of claim 1, wherein the instructions executable by the at least one processor to receive the first control signaling further cause the UE to:
  receive an indication of a component carrier or a component carrier group associated with transmitting or receiving the termination indication.

14. The apparatus of claim 13, wherein the instructions are further executable by the at least one processor to cause the UE to:
  transmit or receive the at least one repetition using a first component carrier of the component carrier group; and
  transmit or receive the termination indication using a second component carrier of the component carrier group.

15. The apparatus of claim 13, wherein the instructions are further executable by the at least one processor to cause the UE to:
  transmit or receive the at least one repetition using the component carrier; and
  transmit or receive the termination indication using the component carrier.

16. An apparatus for wireless communication at a network entity, comprising:
  at least one processor; and
  memory coupled with the at least one processor, the memory storing instructions executable by the at least one processor to cause the network entity to:
    transmit first control signaling comprising scheduling information corresponding to one or more first resources in a time domain for a user equipment (UE) to transmit or receive a plurality of repetitions of a channel and corresponding to one or more second resources in the time domain for the UE to transmit or receive a termination indication associated with the plurality of repetitions;
    transmit or receive, during at least one resource of the one or more first resources, at least one repetition of the plurality of repetitions; and
    transmit or receive, during the one or more second resources and prior to a termination of the one or more first resources, the termination indication based at least in part on successfully transmitting or receiving the at least one repetition of the plurality of repetitions.

17. The apparatus of claim 16, wherein the instructions are further executable by the at least one processor to cause the network entity to:
  transmit or receive, during one or more third resources non-overlapping in the time domain with the one or more second resources, a feedback message associated with transmitting or receiving the at least one repetition.

18. The apparatus of claim 16, wherein the plurality of repetitions are uplink repetitions and the instructions executable by the at least one processor to transmit or receive the termination indication further cause the network entity to:
  transmit second control signaling comprising the termination indication in accordance with a transmission format, wherein the transmission format comprises a hybrid automatic repeat request identifier and one or more resource elements.

19. The apparatus of claim 18, wherein the instructions are further executable by the at least one processor to cause the network entity to:
  determine respective log-likelihood ratios for the plurality of repetitions, wherein successfully transmitting or receiving the at least one repetition is based at least in part on an estimation associated with a log-likelihood ratio corresponding to the at least one repetition satisfying a threshold value.

20. The apparatus of claim 18, wherein the second control signaling is transmitted in accordance with a same transmission format as the first control signaling.

21. The apparatus of claim 18, wherein the second control signaling is transmitted in accordance with a different transmission format than the first control signaling.

22. The apparatus of claim 16, wherein the plurality of repetitions are downlink repetitions and the instructions executable by the at least one processor to transmit or receive the termination indication further cause the network entity to:
  receive second control signaling comprising the termination indication.

23. The apparatus of claim 16, wherein the termination indication indicates that the UE is to use a remaining portion of the plurality of repetitions for energy harvesting, communicating with an energy harvesting device, or both.

24. The apparatus of claim 16, wherein the termination indication indicates that the UE is to use a remaining portion of the plurality of repetitions for communications.

25. The apparatus of claim 16, wherein the termination indication comprises transmission parameters corresponding to a remaining portion of the plurality of repetitions, the transmission parameters comprising a beamforming parameter, a precoder value, a quasi-colocation value, a transmit power, or any combination thereof.

26. The apparatus of claim 16, wherein the instructions executable by the at least one processor to transmit the first control signaling further cause the network entity to:
  transmit an indication of a component carrier or a component carrier group associated with transmitting or receiving the termination indication.

27. The apparatus of claim 26, wherein the instructions are further executable by the at least one processor to cause the network entity to:
  transmit or receive the at least one repetition using a first component carrier of the component carrier group; and
  transmit or receive the termination indication using a second component carrier of the component carrier group.

28. The apparatus of claim 26, wherein the instructions are further executable by the at least one processor to cause the network entity to:
  transmit or receive the at least one repetition using the component carrier; and
  transmit or receive the termination indication using the component carrier.

29. A method for wireless communication at a user equipment (UE), comprising:
  receiving first control signaling comprising scheduling information corresponding to one or more first resources in a time domain for the UE to transmit or receive a plurality of repetitions of a channel and corresponding to one or more second resources in the time domain for the UE to transmit or receive a termination indication associated with the plurality of repetitions;
  transmitting or receiving, during at least one resource of the one or more first resources, at least one repetition of the plurality of repetitions; and
  transmitting or receiving, during the one or more second resources and prior to a termination of the one or more first resources, the termination indication based at least in part on successfully transmitting or receiving the at least one repetition of the plurality of repetitions.

30. A method for wireless communication at a network entity, comprising:
  transmitting first control signaling comprising scheduling information corresponding to one or more first resources in a time domain for a user equipment (UE) to transmit or receive a plurality of repetitions of a channel and corresponding to one or more second resources in the time domain for the UE to transmit or receive a termination indication associated with the plurality of repetitions;
  transmitting or receiving, during at least one resource of the one or more first resources, at least one repetition of the plurality of repetitions; and
  transmitting or receiving, during the one or more second resources and prior to a termination of the one or more first resources, the termination indication based at least in part on successfully transmitting or receiving the at least one repetition of the plurality of repetitions.

* * * * *